US011695932B2

(12) United States Patent
Kondrad et al.

(10) Patent No.: US 11,695,932 B2
(45) Date of Patent: Jul. 4, 2023

(54) TEMPORAL ALIGNMENT OF MPEG AND GLTF MEDIA

(71) Applicant: Nokia Technologies Oy, Espoo (FI)

(72) Inventors: Lukasz Kondrad, Munich (DE); Lauri Ilola, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/480,546

(22) Filed: Sep. 21, 2021

(65) Prior Publication Data

US 2022/0094941 A1 Mar. 24, 2022

Related U.S. Application Data

(60) Provisional application No. 63/082,103, filed on Sep. 23, 2020.

(51) Int. Cl.
*H04N 19/132* (2014.01)
*H04N 19/65* (2014.01)
*H04N 19/136* (2014.01)

(52) U.S. Cl.
CPC .......... *H04N 19/132* (2014.11); *H04N 19/136* (2014.11); *H04N 19/65* (2014.11)

(58) Field of Classification Search
CPC ..... H04N 19/132; H04N 19/136; H04N 19/65
See application file for complete search history.

(56) References Cited

U.S. PATENT DOCUMENTS

2005/0167707 A1* 8/2005 Funaki ............. H01L 27/14687
257/E27.152
2005/0226324 A1* 10/2005 Ouyang ......... H04N 21/440218
375/240.03

(Continued)

FOREIGN PATENT DOCUMENTS

JP 2004146860 A * 12/2000
JP 2005507098 A * 3/2002

(Continued)

OTHER PUBLICATIONS

"(36.1) Proposed extensions of gIFT2 for supporting MPEG media", Shuichi Aoki et al., MPEG document m53397, MPEG Document Management System, 130$^{th}$ meeting, Apr. 23, 202, 6 pages.

(Continued)

*Primary Examiner* — Zaihan Jiang
(74) *Attorney, Agent, or Firm* — Joseph C. Drish; Harrington & Smith

(57) ABSTRACT

An apparatus includes at least one processor; and at least one memory including computer program code; wherein the at least one memory and the computer program code are configured to, with the at least one processor, cause the apparatus at least to: provide an animation timing extension; wherein the animation timing extension links a graphics library transmission format animation to timed metadata and a metadata track of the timed metadata; wherein the metadata track of the timed metadata is listed with an object associated with moving picture media; and align at least one timeline of the moving picture media with at least one timeline of the graphics library transmission format animation; wherein a sample of the metadata track is used to manipulate an animation event.

34 Claims, 16 Drawing Sheets

(56) References Cited

U.S. PATENT DOCUMENTS

| | | | | |
|---|---|---|---|---|
| 2006/0056740 A1* | 3/2006 | Muraki | ............... | G11B 27/02 |
| 2008/0059348 A1* | 3/2008 | Glassman | ............ | G06Q 40/00 |
| | | | | 705/400 |
| 2016/0026730 A1* | 1/2016 | Hasan | ............... | G06F 16/986 |
| | | | | 715/234 |
| 2017/0270702 A1 | 9/2017 | Gauthier et al. | | |
| 2020/0143593 A1* | 5/2020 | Rudman | ............... | G06T 19/006 |

FOREIGN PATENT DOCUMENTS

| | | | | | |
|---|---|---|---|---|---|
| JP | 2004146860 A | * | 5/2004 | ............ | G06Q 30/06 |
| JP | 2005507098 A | * | 3/2005 | | |
| JP | 2009089744 A | * | 4/2009 | | |
| JP | 4384813 B2 | * | 12/2009 | | |
| JP | 4384813 B2 | * | 12/2009 | ............ | G06T 13/00 |
| JP | 2009089744 A | * | 10/2010 | | |

OTHER PUBLICATIONS

"Technologies under Considerations on Support of MPEG Media in Scene Descriptions", Convenor, ISO/IEC JTC 1/SC 29/WG11, N19446, Jul. 3, 2020, 27 pages.
"glTF—An overview of the basics of the GL Transmission Format", http://github.com/javagl/gitfOverview/releases/download/v2.0.0b/gitfOverview-2.0.0b-8pages.pdf.; Feb. 4, 2022, 8 pages.

\* cited by examiner

```
aligned(8) abstract class SampleEntry (unsigned int(32) format)
    extends Box(format){
        const unsigned int(8)[6] reserved = 0;
        unsigned int(16) data_reference_index;
} aligned(8) class SampleDescriptionBox (unsigned int(32)
handler_type)
    extends FullBox('stsd', version, 0){
        int i ;
        unsigned int(32) entry_count;
        for (i = 1 ; i <= entry_count ; i++){
            SampleEntry();      // an instance of a class derived
from                                        SampleEntry
        }
}
```

FIG. 1

```
aligned(8) class glTFAnimationSample
{
  unsigned int(16) num_events;
  for(i=0; i < num_events; i++){
    unsigned int(32) index;
    int(32) speed;
    unsigned int(8) state;
    unsigned in(24) reserved;
  }
}
```

FIG. 4

```
aligned(8) class glTFAnimationSample
{
  unsigned int(1) apply_to_all;
  unsigned int(7) reserved;
  unsigned int(16) num_events;
  for(i=0; i < num_events; i++){
    unsigned int(32) index;
    int(32) speed;
    unsigned int(8) state;
    unsigned in(24) reserved;
  }
}
```

FIG. 5

```
aligned(8) class glTFAnimationSampleEntry()
  extends MetadataSampleEntry ('glat') {
}
```

FIG. 6

```
{
    "$schema" : "http://json-schema.org/draft-04/schema",
    "title" : "MPEG_animation_timing extension",
    "type" : "object",
    "description": "glTF extension to specify timing of
animations",
    "allOf": [ { "$ref": "glTFChildOfRootProperty.schema.json" }
],
    "properties" : {
        "source": {
            "allOf": [ { "$ref": "glTFid.schema.json" } ],
            "description": "The index of the MPEG media."
        },
        "track": {
            "allOf": [ { "$ref": "glTFid.schema.json" } ],
            "description": "The index of a track of the MPEG media
containing timing information."
        }
    }
}
```

FIG. 7

```
{
    "extensions": {
        "MPEG_media": {
            media: [
                {
                    "name": "source 0",
                    "alternatives": [
                        {
                            "mimeType": "application/mp4",
                            "uri": "file.mp4",
                            "tracks": [
                                {
                                    "track": "#track_ID=1"
                                }
                            ]
                        }
                    ]
                }
            ]
        }
    },
    "animations": [
        {
            "name": "Animate all properties of one node with different samplers",
            "channels": [
                {
                    "sampler": 0,
                    "target": {
                        "node": 1,
                        "path": "rotation"
                    }
                },
                {
                    "sampler": 1,
                    "target": {
                        "node": 1,
                        "path": "scale"
                    }
                },
            ],
            "samplers": [
                {
                    "input": 4,
                    "interpolation": "LINEAR",
                    "output": 5
                },
                {
                    "input": 4,
                    "interpolation": "LINEAR",
                    "output": 6
                }
            ]
        }
    "extensions": {
            "MPEG_animation_timing": {
                "source": 0,
                "track": 0
            }
        }
}
```

FIG. 8

```
{
    "$schema" : "http://json-schema.org/draft-04/schema",
    "title" : "MPEG_buffer_item extension",
    "type" : "object",
    "description": "glTF extension to specify buffer stored as
item in ISOBMFF",
    "allOf": [ { "$ref": "glTFChildOfRootProperty.schema.json" }
],
    "properties" : {
        "source": {
            "allOf": [ { "$ref": "glTFid.schema.json" } ],
            "description": "The index of the MPEG media."
        },
        "track": {
            "allOf": [ { "$ref": "glTFid.schema.json" } ],
            "description": "The index of a track of the MPEG
media."
        }
    }
}
```

FIG. 10

```
{
    "extensions": {
        "MPEG_media": {
            media: [
                {
                    "name": "source 0",
                    "alternatives": [
                        {
                            "mimeType": "application/mp4",
                            "uri": "file.mp4",
                            "tracks": [
                                {
                                    "track": "#item_ID=1"
                                }
                            ]
                        }
                    ]
                }
            ]
        }
    },
    "buffers": [
        {
            "byteLength": 1024,
            "extensions": {
                "MPEG_buffer_item": {
                    "source": 0,
                    "track": 0
                }
            }
        }
    ]
}
```

FIG. 11

```
aligned(8) class glTFSample
{
  unsigned int(8) type;
  unsigned int(32) length;
  for(i=0; i < length; i++){
    unsigned int(8) data;
  }
}
```

FIG. 14

```
aligned(8) class glTFSampleEntry()
  extends MetadataSampleEntry ('gltf') {
}
```

FIG. 15

TEMPORAL ALIGNMENT OF MPEG AND GLTF MEDIA

RELATED APPLICATION

This application claims priority to U.S. Provisional Application No. 63/082,103, filed Sep. 23, 2020, which is hereby incorporated by reference in its entirety.

TECHNICAL FIELD

The examples and non-limiting embodiments relate generally to volumetric video coding, and more particularly, to temporal alignment of MPEG and GLTF media.

BACKGROUND

It is known to perform video coding and decoding.

SUMMARY

In accordance with an aspect, an apparatus includes at least one processor; and at least one memory including computer program code; wherein the at least one memory and the computer program code are configured to, with the at least one processor, cause the apparatus at least to: provide an animation timing extension; wherein the animation timing extension links a graphics library transmission format animation to timed metadata and a metadata track of the timed metadata; wherein the metadata track of the timed metadata is listed with an object associated with moving picture media; and align at least one timeline of the moving picture media with at least one timeline of the graphics library transmission format animation; wherein a sample of the metadata track is used to manipulate an animation event.

In accordance with an aspect, an apparatus includes at least one processor; and at least one memory including computer program code; wherein the at least one memory and the computer program code are configured to, with the at least one processor, cause the apparatus at least to: provide a utility to align: graphics library transmission format temporal media information that describes an animation timeline; moving picture temporal media information that describes a moving picture timeline; and global runtime temporal information that describes a global application timeline; wherein the alignment utilizes at least one graphics library transmission format file, a base media file format, or a sample to synchronize the graphics library transmission format temporal media information and the moving picture temporal media information with the global runtime temporal information.

BRIEF DESCRIPTION OF THE DRAWINGS

The foregoing aspects and other features are explained in the following description, taken in connection with the accompanying drawings, wherein:

FIG. 1 shows an example SampleEntry class and an example SampleDescriptionBox class.

FIG. 4 is an example sample format syntax of an animation.

FIG. 5 is an example sample format syntax of an animation having a scripting event flag.

FIG. 6 is an example sample entry defining allowing to identify an animation track containing gltfAnimationSample.

FIG. 7 is an example definition of an MPEG animation extension.

FIG. 8 shows an example use of the MPEG animation extension in animation node of glTF.

FIG. 10 shows an example MPEG buffer extension.

FIG. 11 shows an example use of the MPEG buffer extension in animation node of glTF.

FIG. 14 is an example sample format syntax of glTF.

FIG. 15 is an example sample entry definition that allows to identify a gltf track containing glTFSample.

DETAILED DESCRIPTION OF EXAMPLE EMBODIMENTS

Figure 2:
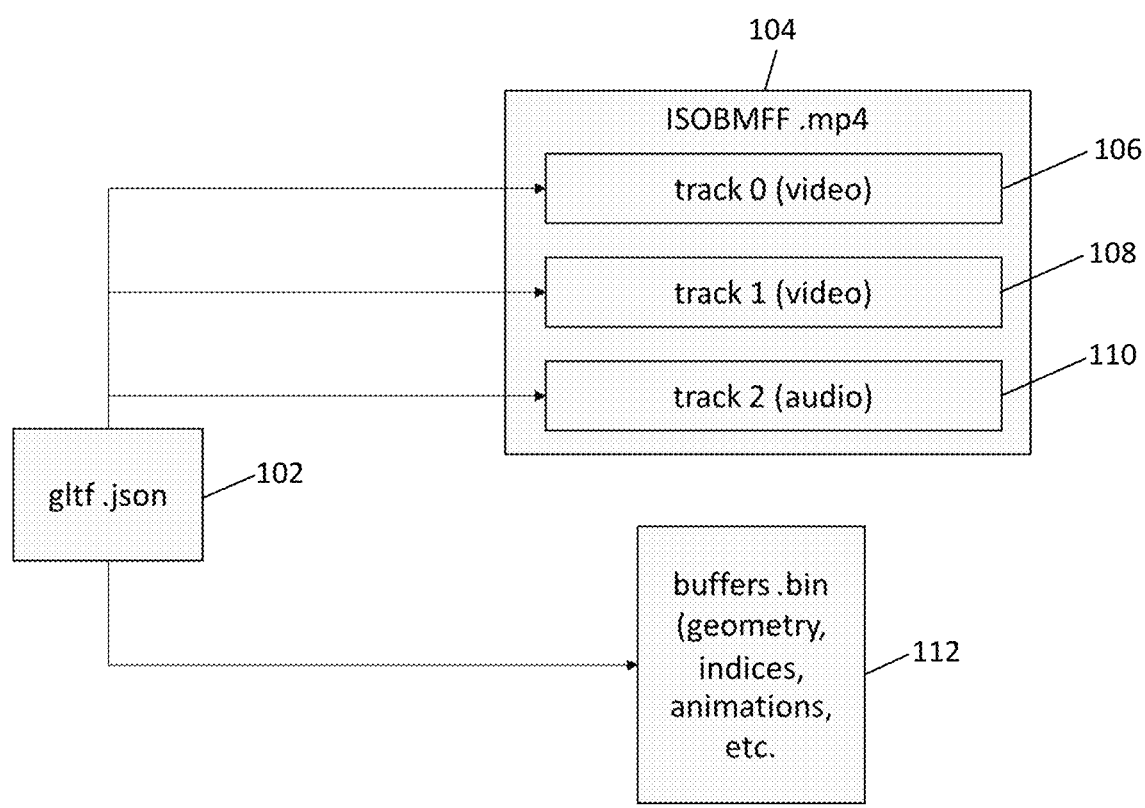
FIG. 2 shows the data relationship in MPEG-I Scene Description.

As part of ongoing work in ISO SC29 WG3, the use of scene description formats for enabling immersive AR and 6dof experiences is studied. The working group has chosen glTF as the starting point for MPEG scene description initiative for delivery of 3d assets. MPEG is working to add temporally updated video and audio to scene objects.

GLTF

The GL Transmission Format (glTF) is a JSON based rendering API agnostic runtime asset delivery format. glTF bridges the gap between 3D content creation tools and modern 3D applications by providing an efficient, extensible, interoperable format for the transmission and loading of 3D content.

glTF assets are JSON files plus supporting external data. Specifically, a glTF asset is represented by: a JSON-formatted file (.gltf) containing a full scene description: node hierarchy, materials, cameras, as well as descriptor information for meshes, animations, and other constructs; binary files (.bin) containing geometry and animation data, and other buffer-based data; and image files (.jpg, .png) for textures.

The JSON formatted file contains information about the binary files that describes how they may be used when uploaded to a GPU with minimal processing. This makes the glTF particularly well suitable for runtime delivery, as the assets may be directly copied into GPU memory for the rendering pipeline.

Assets defined in other formats, such as images, may be stored in external files referenced via URI, stored side-by-side in a GLB container, or embedded directly into the JSON using data URIs.

glTF has been designed to allow extensibility. While the initial base specification supports a rich feature set, there will be many opportunities for growth and improvement.

glTF defines a mechanism that allows the addition of both general-purpose and vendor-specific extension.

Temporal Information in glTF glTF supports descriptive and skinned animations via key frame animations. Key frame data is stored in buffers and referenced in animations using accessors. glTF also supports animation of morph targets. Animation capabilities in glTF are very limited, supporting merely animation of node transforms and morph target weights. Animation of texture for example is not supported. Key frame timings are defined as seconds that relate to a specific animation timeline. An animation may consist of several key frames, each describing the state of an object at said keyframes. The animation is created by interpolating node transformations between key frame states.

glTF only defines animation storage, and it doesn't define any particular runtime behavior, such as: order of playing, auto-start, loops, mapping of timelines, etc. For example, a glTF file may contain two animations, which both contain key frame timing at 1.0. This does not mean that both or either of the key frames would be played at 1.0 seconds in application time. Animations might each contain multiple channels targeting a model's various bones or properties. The client implementation may choose when to play any of the available animations.

All animations are stored in the animations array of the asset. An animation is defined as a set of channels (the channels property) and a set of samplers that specify accessors with key frame data and an interpolation method (the samplers property).

Box-Structured File Formats

Box-structured and hierarchical file format concepts have been widely used for media storage and sharing. The most well-known file formats in this regard are the ISO Base Media File Format (ISOBMFF) and its variants such as MP4 and 3GPP file formats.

ISOBMFF allows storage of timely captured audio/visual media streams, called media tracks. The metadata which describes the track is separated from the encoded bitstream itself. The format provides mechanisms to access media data in a codec-agnostic fashion from a file parser perspective.

In files conforming to the ISO base media file format, the media data may be provided in one or more instances of MediaDataBox 'mdat' and the MovieBox 'moov' may be used to enclose the metadata for timed media. In some cases, for a file to be operable, both of the 'mdat' and 'moov' boxes may be required to be present. The 'moov' box may include one or more tracks, and each track may reside in one corresponding TrackBox 'trak'. Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

SampleDescriptionBox

The 'trak' box includes in its hierarchy of boxes the SampleTableBox (also known as the sample table or the sample table box). The SampleTableBox contains the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g., VisualSampleEntry, AudioSampleEntry). The type of sample entry form used for derivation of the track-type specific sample entry format is determined by the media handler of the track. FIG. 1 shows an example SampleEntry class and an example SampleDescriptionBox class.

Derived specifications deriving Sample Entry classes defined in ISO/IEC 14496-12. SampleEntry boxes may contain "extra boxes" not explicitly defined in the box syntax of ISO/IEC 14496-12. When present, such boxes shall follow all defined fields and should follow any defined contained boxes. Decoders shall presume a sample entry box could contain extra boxes and shall continue parsing as though they are present until the containing box length is exhausted.

Sync Samples in ISOBMFF

Several types of stream access points (SAPs) have been specified. SAP Type 1 corresponds to what is known in some coding schemes as a "Closed group of pictures (GOP) random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than an intra-coded picture associated with the SAP.

A stream access point (SAP) sample group as specified in ISOBMFF identifies samples as being of the indicated SAP type.

A sync sample may be defined as a sample corresponding to SAP type 1 or 2. A sync sample can be regarded as a media sample that starts a new independent sequence of samples; if decoding starts at the sync sample, it and succeeding samples in decoding order can all be correctly decoded, and the resulting set of decoded samples forms the correct presentation of the media starting at the decoded sample that has the earliest composition time. Sync samples can be indicated with the SyncSampleBox (for those samples whose metadata is present in a TrackBox) or within sample flags indicated or inferred for track fragment runs.

Items in ISOBMFF

Files conforming to the ISOBMFF may contain any non-timed objects, referred to as items, meta items, or metadata items, in a MetaBox 'meta', which may also be called MetaBox. While the name of the meta box refers to metadata, items can generally contain metadata or media data. The meta box may reside at the top level of the file, within a MovieBox 'moov', and within a TrackBox 'trak', but at most one meta box may occur at each of the file level, movie level, or track level. The meta box may be required to contain a HandlerReferenceBox 'hdlr' indicating the structure or format of the MetaBox 'meta' contents. The MetaBox may list and characterize any number of items that can be referred and each one of them can be associated with a file name and can be uniquely identified with the file by an item identifier (e.g. item id) which is an integer value. The metadata items may be for example stored in ItemDataBox 'idat' of the MetaBox or in an 'mdat' box or reside in a separate file. If the metadata is located external to the file, then its location may be declared by the DataInformationBox 'dinf'. In the specific case that the metadata is formatted using eXtensible Markup Language (XML) syntax and is required to be stored directly in the MetaBox, the metadata may be encapsulated into either the XMLBox 'xml' or the BinaryXMLBox 'bxml'. An item may be stored as a contiguous byte range, or it may be stored in several extents, each being a contiguous byte range. In other words, items may be stored fragmented into extents, e.g., to enable interleaving. An extent is a contiguous subset of the bytes of the resource, and the resource can be formed by concatenating the extents.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the context of HEIF, the following boxes may be contained within the root-level 'meta' box and may be used as described hereinafter. In HEIF, the handler value of the handler box of the 'meta' box is 'pict'. The resource (whether within the same file, or in an external file identified by a uniform resource identifier) containing the coded media data is resolved through the DataInformationBox 'dinf', whereas the ItemLocationBox 'iloc' box stores the position and sizes of every item within the referenced file. The ItemReferenceBox 'iref' documents relationships between items using typed referencing. If there is an item among a collection of items that is in some way to be considered the most important compared to others, then this item is signaled by the PrimaryItemBox 'pitm'. Apart from the boxes mentioned here, the 'meta' box is also flexible to include other boxes that may be necessary to describe items.

Any number of image items can be included in the same file. Given a collection of images stored by using the 'meta' box approach, certain relationships may be qualified between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

The ItemPropertiesBox enables the association of any item with an ordered set of item properties. Item properties are small data records. The ItemPropertiesBox consists of two parts: an ItemPropertyContainerBox that contains an implicitly indexed list of item properties, and one or more ItemPropertyAssociationBox(es) that associate items with item properties. An item property is formatted as a box.

A descriptive item property may be defined as an item property that describes rather than transforms the associated item. A transformative item property may be defined as an item property that transforms the reconstructed representation of the image item content.

MPEG scene description work is focusing on usage of GTLF for delivery of 3d assets and video and audio information related to scene objects. Video and audio are typically less interactive than 3d applications, where the user may freely explore the content in the 3d world. Video and audio objects are typically pre-determined and the compression of said information heavily relies on prediction, which is why video and audio typically operate at a fixed timeline. 3d content on the other hand depends on the user interaction and events and animations may be triggered by multiple reasons. Animations therefore don't have a fixed global timeline and temporal transformations and state information related to an animation are typically described in the temporal context of said animation.

This different nature of temporal information generates a major problem, when combining glTF 3d assets with temporal information from an ISOBMFF file. It is unclear and unspecified how an application should aim to align animation timelines, which may be triggered at any point of time, with fixed temporal information from video and audio objects. Key frame timing for glTF animations is defined as seconds in an animation specific timeline. Animations may be triggered several times during the life span of the 3d object or some animation actions may be chained. Timing related information in ISOBMFF relates to sample timings, which operate on a fixed ISOBMFF timeline.

glTF only defines storage of animations, not any particular runtime behavior, such as: order of playing, auto-start, loops, mapping of timelines, etc. This means that scripting of pre-determined animations is left undefined.

In contrast to glTF, video file formats contain information per frame, where the timing is related to the video timeline. Every frame is associated with a timestamp on when it should be decoded and presented/composited.

These two timelines are different in that the first one is based on user and application behavior and the second is pre-defined. As of yet, alignment between these timelines is not defined by any known standard. Furthermore, alignment between different timelines will enable creation of narrated stories where both animations and MPEG content produce new kinds of immersive experiences. One could for example envision a format, where the scene is encoded as a mesh which is overlaid by baked texture information. The texture information may be temporally changing and reflect changes in global illumination. The scene mesh or geometry may also be animated in a way that geometry-based changes in global illumination are already baked in the scene textures. This would enable low complexity rendering on devices with minimal compute power.

For the purposes of the examples described herein, three different timelines are referred to: 1) Global timeline or application timeline, which describes the temporal information for the runtime; 2) Animation timeline, which describes temporal information on keyframes related to a specific animation; and 3) MPEG timeline, which describes temporal information for video and audio tracks.

There are several ways of aligning the temporal information between various timelines. One potential solution is to provide a global timeline for the application as an ISOBMFF track or embedded in another track as sub samples, which allows scripting glTF animations and events. The benefit of this approach is that embedding scripting information in an ISOBMFF track naturally aligns it with the rest of MPEG media. The solution requires defining a novel sample or sub sample format for scripting glTF.

Another solution is to embed glTF files as such in ISOBMFF. This allows updating the scene by providing updates to the scene for example through the JSON patch protocol. Alternatively, the glTF files could be re-signaled and references to binary data reused whenever possible. MPEG Carriage of Web Resources (ISO/IEC 23001-15) already defines ways of encapsulating JSON data in a sample, which could be reformatted for the purposes of the examples described herein. Additionally, it would require mandating certain behavioral aspects for harmonized client implementations.

The benefit of the designs described herein is that they introduce the ability to script glTF based presentations to produce a pre-determined result. As such the examples described herein allow the creation of narrated 3d experiences, which may consist of 3d and MPEG content. The designs described herein allow for efficient reutilization of animation data without replication. Furthermore, the examples described herein allow for synchronization of glTF and MPEG timelines and define behavioral limitations for manipulating narrated experiences, including pausing, cancelling and changing the speed of animation.

As discussed earlier, the challenge of aligning temporal information between glTF and MPEG media requires introduction of a global or application timeline, which may be used to map temporal information between other timelines. The starting time for said timeline may be defined as the point of time, when a user starts to consume a narrated 3d experience. For example, this may be initiated by the user, a remote signal or other event.

The animation timeline must somehow be anchored to the global timeline. This may for example be done, by defining a scripting event on the global timeline, that triggers said animation. It should be then possible to map animation timeline keyframe timings to the global timeline to produce a narrated animation at any point in the global timeline with a known outcome. The scripting of animations through a global timeline should allow reutilization of animation data without binary buffer replication.

The MPEG timeline is specific to video and audio content. Depending on the desired signaling of the global timeline, the MPEG timeline may be naturally aligned with it, e.g. if the global timeline is stored in an ISOBMFF container along with other MPEG media. Or it may require to be explicitly converted to the global timeline, e.g. if it is stored in another ISOBMFF container or if the global timeline depends on external events.

Scripting of pre-defined events should take place in the global timeline. This allows triggering an animation or starting video play-back at a specific global time. As of today, glTF does not support narrated 3d experiences and the behavior of animations is left for implementations to decide. E.g. if a glTF file contains two animations, with overlapping keyframe timings, the application may decide to play both animations at the same time, play them sequentially, or associate a user interaction with animations.

Merging of narrated and user interaction-based content is not necessarily straightforward. Challenges may occur if the user initiates an action in the middle of a narrated period that conflicts with the narrative. Application level behavioral limitations may be defined to either disable user interactions during narrated periods, or the state of the narrated period may be paused and saved to wait for user-initiated behavior to finish. In the latter example, the user-initiated action should be performed on a default state of a node. For example, animation glitches may occur if a narrated event is morphing a mesh when the user initiates an animation for the same mesh. The default state of the object should therefore be used for the user-initiated action as the basis for animating transformations.

Another aspect of this novel consumption of different media is the pausing of timelines. By pausing the global timeline for narrated content, it is expected that the animation and MPEG timelines would be paused as well. However, the animation and MPEG timelines could be paused without pausing the global timeline, when an experience allows user interactions. It should also be noted that for some experiences the animation timeline and MPEG timeline have a dependency, whereas in other experiences these may operate on individual timelines.

FIG. 2 illustrates the architecture of scene description work currently in MPEG. There is a glTF json file 102, which describes the assets for the scene. It may refer to one or more ISOBMFF files which may in turn contain one or more tracks for audio or video data. The glTF json file 102 points to ISOBMFF 104 using a URI. The URI can point to a locally stored file or a file stored on a remote server. In the latter case the URI may for example point to a DASH manifest file that provides necessary information to fetch the data. The glTF 102 also refers to a binary file 112, which contains 3d information for scene assets, like vertex data, indices, animations, colors, etc. As further shown in FIG. 2, the ISOBMFF 104 comprises track 0 (video) 106, track 1 (video) 108, and track 2 (audio) 110.

Figure 3:
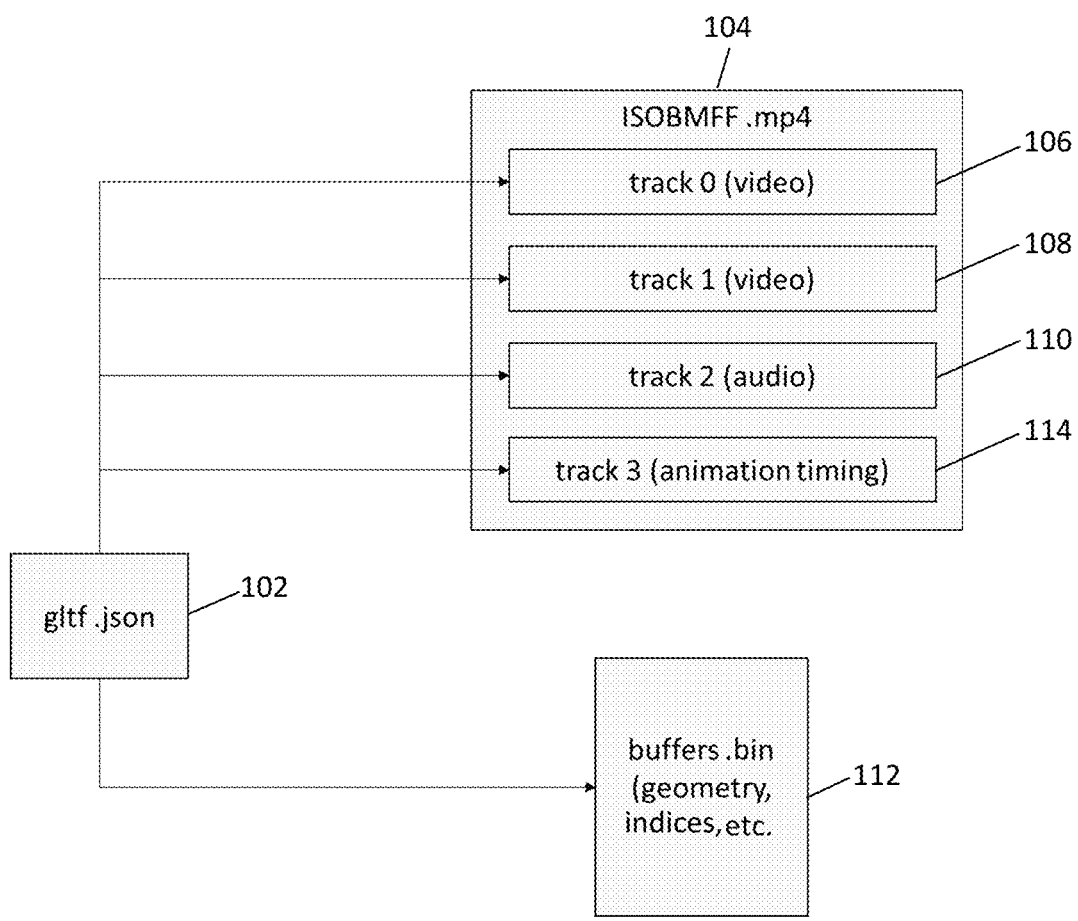
FIG. 3 shows an example data relationship in MPEG-I Scene Description with an animation timing track.

FIG. 3 shows an example data relationship in MPEG-I Scene Description with an animation timing track. The first embodiment utilizes the ISOBMFF metadata track 104 to store temporal information for narrated 3d content. In practice this means that a sample 114 in the metadata track is used to manipulate an animation event defined in the glTF JSON file 102. The sample timing of the metadata track defines, when in the global timeline the animation should be manipulated. The sample format 114 itself contains information, which animation should be triggered or otherwise manipulated. The metadata track 114 may be stored in the ISOBMFF file 104 along with other MPEG media, which will naturally provide utility to align manipulations of glTF animations with the MPEG video and audio tracks. An example of the data relationship with the new animation track 114 is provided on FIG. 3.

The binary 3d data for glTF could be stored outside the ISOBMFF or as item(s) in ISOBMFF. The benefit of the design is that the animation related data may be reused without replication, when an animation is referred to from a sample several times. For example, an animated rotating cube may be defined as a single 360-degree rotation, which may be triggered from the samples with zero replication of animation data. In computer graphics, it is common to define short animations and repeat them to create longer animated sequences. For example, a walking person may be animated by storing a few seconds of walking animation, which is then looped until a desired length of walking animation has been achieved. The same applies for animating bones for skinned meshes.

In the glTF JSON file 102, each animation has a unique index in the animations array. This index may be referred to from the sample data to identify, which animation a sample data should be related to. In order to enable the novel functionality described herein, a new sample format is defined. The intention of the new sample format is to identify animations from glTF file 102 and to describe how said animations should be manipulated. The sample timing as defined in ISOBMFF 104 will provide a mapping of the animation timeline to the global application timeline.

The default duration of the animation is defined by the animation data in the binary glTF buffer and not by the sample duration. The reason for this is that the samples of the metadata should allow triggering different animations in parallel, and also to stop ongoing animations.

The new sample format includes at least the count for animation events, and for each animation event the following information: i) ID, the index of the animation in a glTF animations array; ii) Speed, a multiplier which can be used to speed up animation, slow it down, pause it or reverse it altogether. The default animation speed is 1.0, so anything above it will increase the animation speed, whereas anything below it will reduce animation speed. Anything below 0.0, will cause animation to go backwards; iii) Type, the type of animation event. These may include play, pause, cancel, change speed etc.

In one embodiment the sample format syntax is as shown in FIG. 4, with semantics as follows:
num_events—specifying the number of animation events triggered at the time of the sample.
index—specifying the index value of animation in animation node described in the glTF json file.
speed—specifying a multiplier which indicates the speed of the playout of the animation. A negative value may indicate that the animation should be played in a reverse order, from the end to the start.
state—status of the animation as described in Table 1 that provides semantics of state value of glTFAnimationSample in ISOBMFF.

Table 1 Semantics of state value of glTFAnimationSample in ISOBMFF

| value | identifier | description |
| --- | --- | --- |
| 0 | play | Play the animation |
| 1 | stop | Stop the animation and return to the initial state |
| 2 | pause | Pause the animation |
| 3 | restart | Restart the animation, equivalent to stopping animation and playing it from the beginning |
| 4 | update | Update an animation characteristic, e.g. speed |
| 5 | loop | Sets the animation to be run repeatedly in a loop |
| 6..63 | reserved | Reserved for future use |

FIG. 5 is an example sample format syntax of an animation having a scripting event flag. In another embodiment (an example syntax for which is shown by FIG. 5) a method for manipulating all animations simultaneously is defined. This could mean an existence of a flag, which is set to true if the scripting event is to be applied to all animations in the glTF animations array. This functionality is useful e.g. if a narrated pause everything event is required. When the "apply_to_all" flag is set to true, the animation index is no longer valid and is ignored by the implementation. The sample syntax containing said flag could be defined as shown in FIG. 5, with semantics:
apply_to_all—If equal to 1, the num_events shall equal 1 and the animation event in the sample is applied to all animations in the glTF animations array.

In one embodiment the content of the sample may contain scripted information, like JavaScript, which when executed triggers animations or other events.

In another embodiment (an example syntax of which is demonstrated by FIG. 6) a sample entry is defined allowing identification of an animation track containing gltfAnimationSample. An example is provided below (see also FIG. 6). It may contain additional information.
Sample Entry Type: 'glat'
Container: Sample Description Box ('stsd')
Mandatory: No
Quantity: 0 or 1

In another embodiment the link from a glTF to timed metadata and its respective track listed by MPEG media object is provided by defining an MPEG animation extension, identified by MPEG_animations_timing. The MPEG animation extension is included in the extensionsUsed and extensionsRequired of the scene description document for scene descriptions that require the use of animation timing. Such an example MPEG_animation_timing.schema.json is shown in FIG. 7. An example use of the MPEG animation extension in animation node of glTF is shown in FIG. 8.

Figure 9:
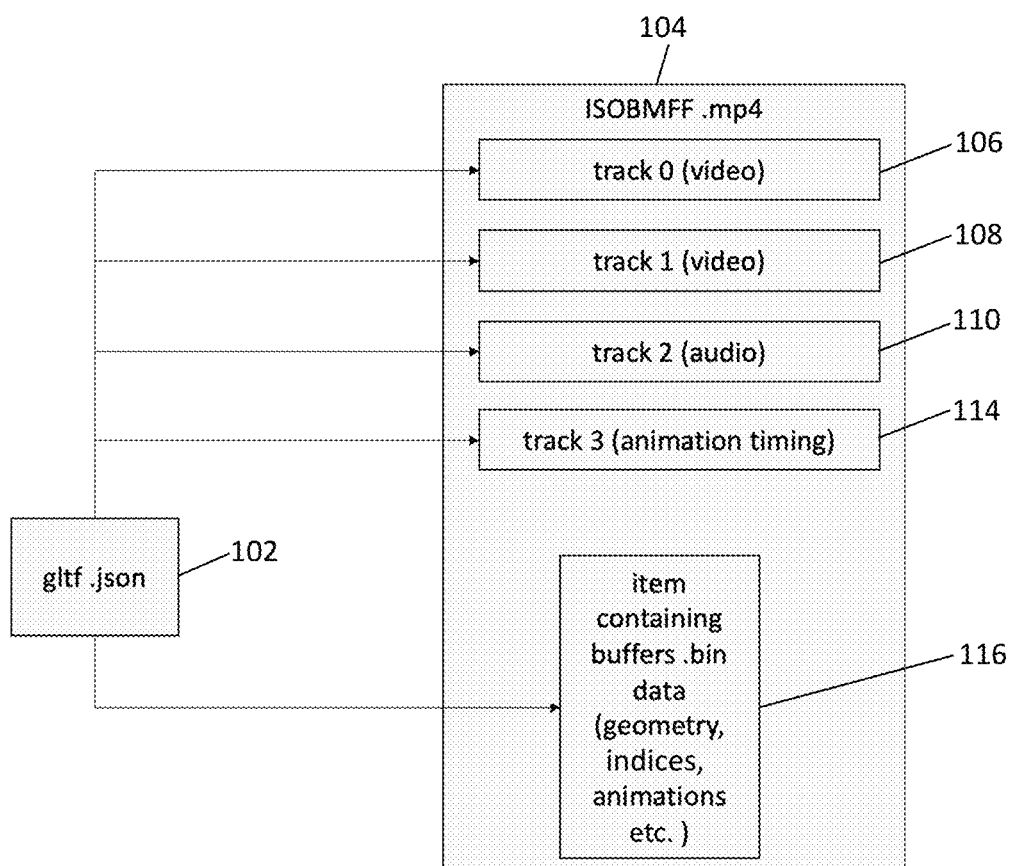
FIG. 9 shows an example data relationship in MPEG-I Scene Description with the binary buffers stored as an item.

In another embodiment all glTF binary buffers are stored in ISOBMFF 104 as item(s) 116 as presented on FIG. 9. The items 116 may be used to store any kind of binary glTF data like vertices, indices, colors or animation related information. The type of information contained in the binary buffers 116 is described by the glTF file accessors and buffer views. With this information an implementation is able to find relevant information from an ISOBMFF item e.g. 104.

In another embodiment the link from a glTF to an item and respective track listed by a MPEG_media object is provided by defining an MPEG buffer extension, identified by MPEG_buffer_item. This embodiment enables the glTF file to explicitly reference an MPEG container and track or item within, which provides binary buffer data relevant for glTF 3d representation. An example such MPEG buffer extension, as a MPEG_buffer_item.schema.json, is provided in FIG. 10. An example use of the MPEG buffer extension in animation node of glTF is shown in FIG. 11.

In another embodiment a glTF buffer item is an item which represents glTF binary data. A new item type 4CC code 'glbi' is defined to identify glTF buffer items. This 4CC code is used by the ISOBMFF container to identify items that contain binary glTF information.

Figure 12:
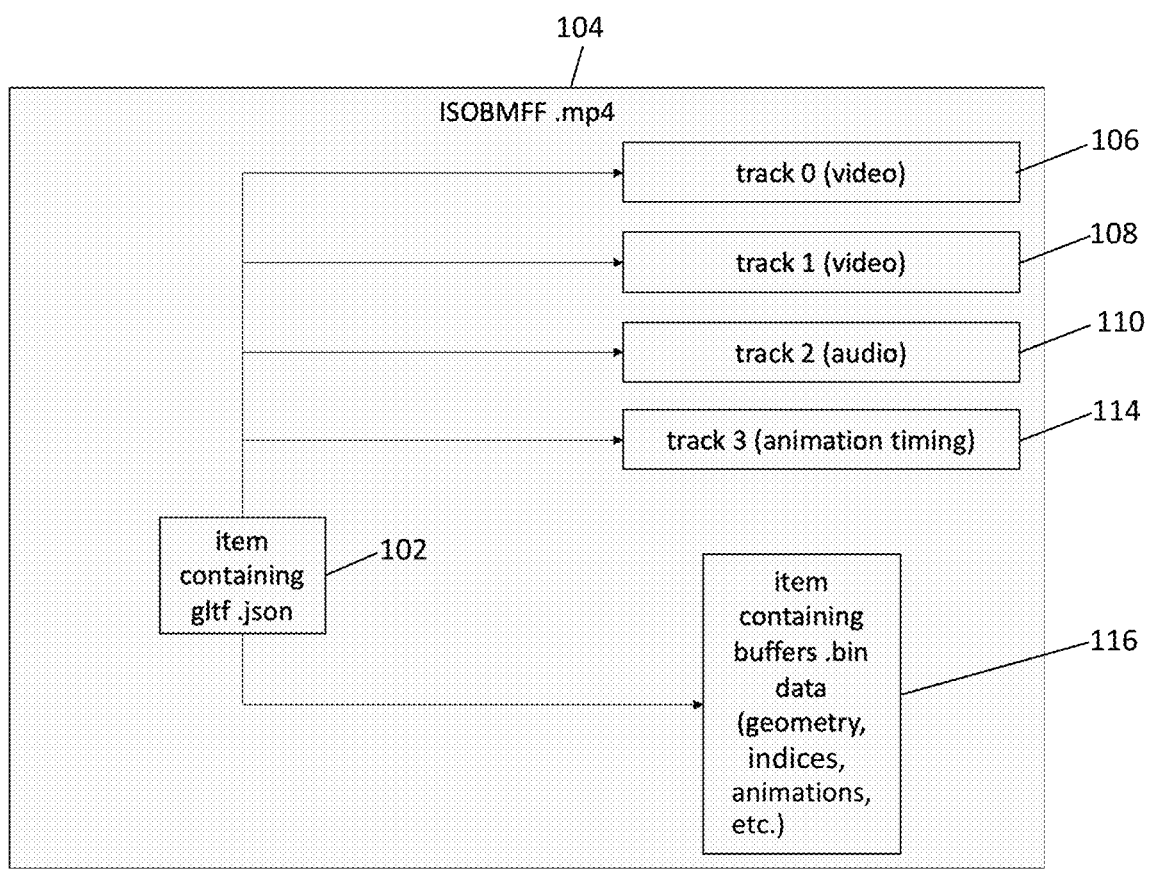
FIG. 12 shows an example data relationship in MPEG-I Scene Description with the glTF .json stored as an item.

In yet another embodiment the gltf .json file 102 is stored in ISOBMFF 104 as one or more item(s) as presented on FIG. 12. With this design a player may download a single file containing all relevant information for a timed scene. From a streaming perspective this design provides added value by providing a way to encapsulate glTF files (such as gltf .json 102) inside ISOBMFF 104.

Figure 13:
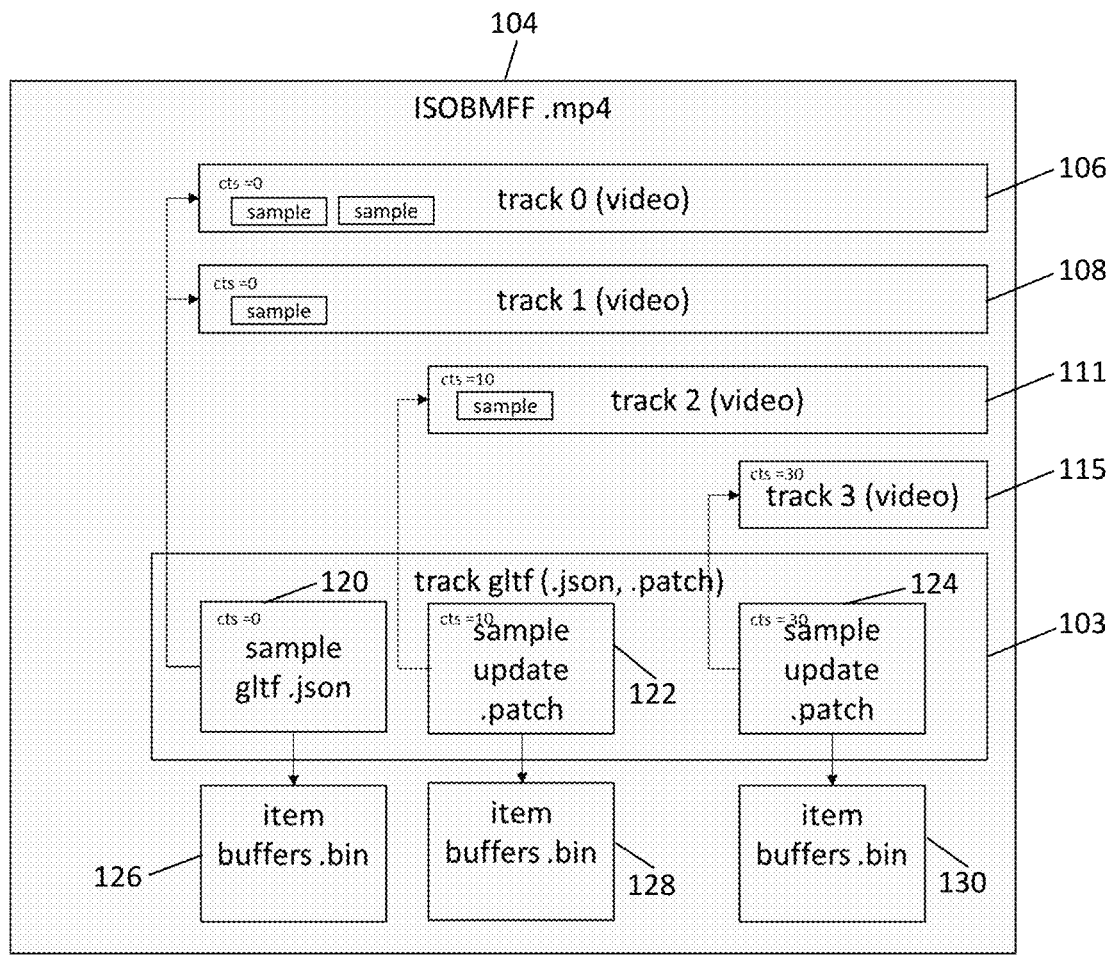
FIG. 13 shows an example data relationship in MPEG-I Scene Description with the glTF .json stored as samples, and the .json updates stored as samples.

In another embodiment the glTF .json are stored as one or more samples of a gltf track 103, presented on a FIG. 13 to provide updates to a scene synchronized with the other media (e.g. other media such as track 0 (video) 106, track 1 (video) 108, track 2 (video) 111, and track 3 (video) 115). The sample design would allow carrying glTF information in timed tracks along with the rest of timed media. A JSON patch update mechanism may be used to signal changes in glTF-j son files (such as sample gltf .json 120). An example of a JSON patch protocol is defined in RFC 6902.

As shown in FIG. 13, the track gltf 103 comprises sample gltf .json 103, sample update .patch 122 (e.g. a patch file), and sample update .patch 124 (e.g. a patch file). The sample gift .json 120 is synchronized with track 0 (video) 106 and track 1 (video) 108, the sample update .patch 122 is synchronized with track 2 (video) 111, and the sample update .patch 124 is synchronized with track 3 (video) 115. As is further shown in FIG. 13, the sample glft .json 120 provides and/or links to item buffers .bin 126, the sample update .patch 122 provides and/or links to item buffers .bin 128, and the sample update .patch 124 provides and/or links to item buffers .bin 130.

In another related embodiment storing glTF files as samples could also be used to update the scene. The JSON description of the file is typically fairly compact and static. Signaling of glTF JSON as samples would in practice mean that some elements of the glTF file are replicated and buffer references to new and old objects are updated. The update sample would always describe the entire state of the scene and not just a part of it, like in the case of a JSON patch update.

In one embodiment the sample format syntax of glTF is defined. This allows carriage glTF data inside ISOBMFF track samples. The sample format is defined as shown in FIG. 14, with semantics as follows:

type—specifies the type of the data contained in the sample as described in Table 2, which provides semantics of the type values of glTFSample in ISOBMFF.

TABLE 2

Semantics of type value of glTFSample in ISOBMFF

| value | identifier | description |
| --- | --- | --- |
| 0 | gltf_json | Gltf json file as specified in https://github.com/KhronosGroup/glTF/tree/master/specification/2.0 (as of September 16, 2020) |
| 1 | patch_json | patch json as specified in RFC 6902 |
| 2..63 | reserved | Reserved for future use | length—specifies the number of bytes containing the data.
data—data contains binary information specified by type.

In another embodiment samples carrying glTF JSON data are defined as sync samples. Samples carrying JSON patch updates are considered regular samples. This allows the file parser to seek sync samples from ISOBMFF sample tables to enable efficient random access.

In another embodiment (an example syntax of which is shown by FIG. 15) a sample entry is defined that allows identification of a gltf track containing glTFSample. This could be useful when the glTF json file contains information which is useful for adaptive streaming control as the sample entry is received as part of the initialization sequence. See below (refer also to FIG. 15).

Sample Entry Type: 'gltf'
Container: Sample Description Box ('stsd')
Mandatory: No
Quantity: 0 or 1

Figure 16:
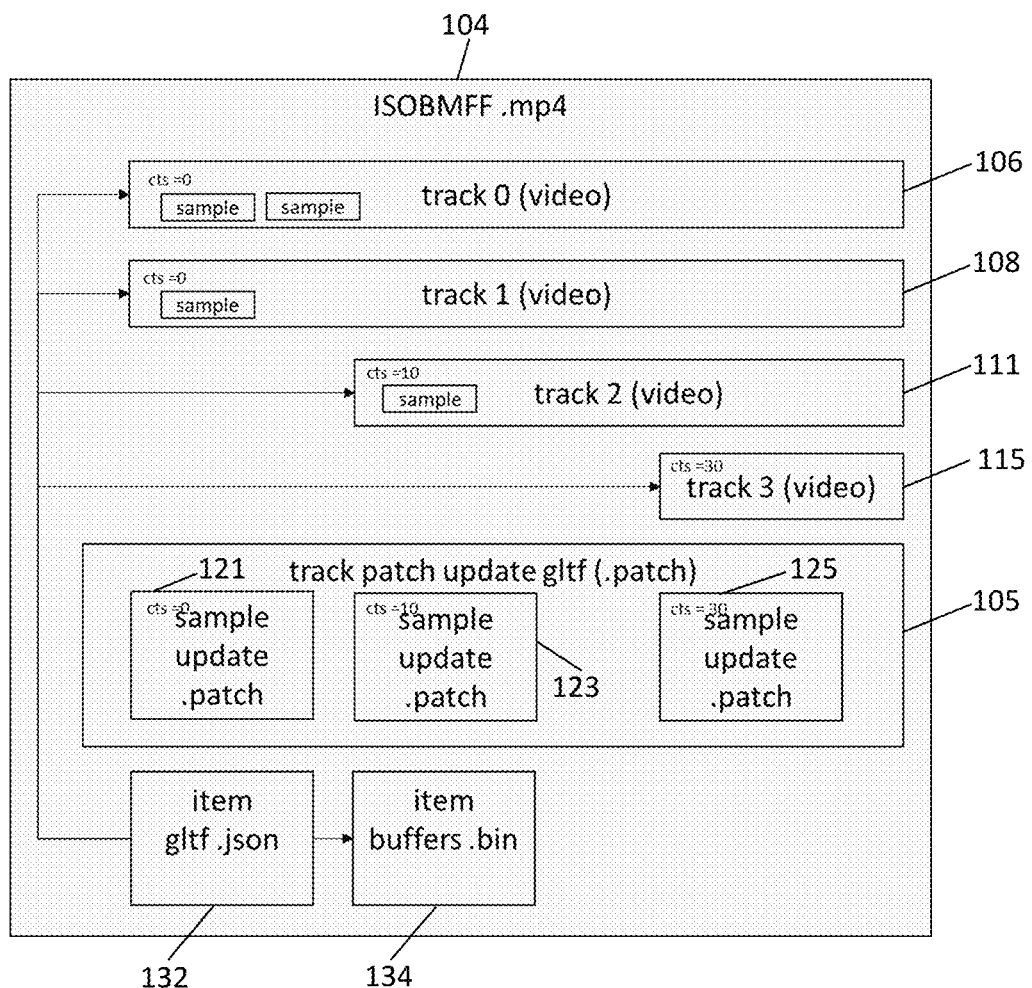
FIG. 16 shows an example data relationship in MPEG-I Scene Description with the glTF .json stored in an item and .json updates stored as samples in a dedicated track.

In another embodiment, as presented on a FIG. 16, the glTF .json is stored as in an item 132 while patch .json updates are stored in samples of a patch update glTF track 105 to provide update to a scene synchronized with the other media. The sample design would allow carrying glTF information in timed tracks along with the rest of timed media. A JSON patch update mechanism may be used to signal changes in glTF-json files.

As shown in FIG. 16, the patch .json updates 105 are stored in samples sample update .patch 121 (e.g. a patch file), sample update .patch 123 (e.g. a patch file), and sample update .patch 125 (e.g. a patch file). The item gltf .json 132 provides and/or links to item buffers .bin 134, and the item gltf .json 132 is synchronized with track 0 video 106, track 1 (video) 108, track 2 (video) 111 and track 3 (video) 115.

Figure 17:
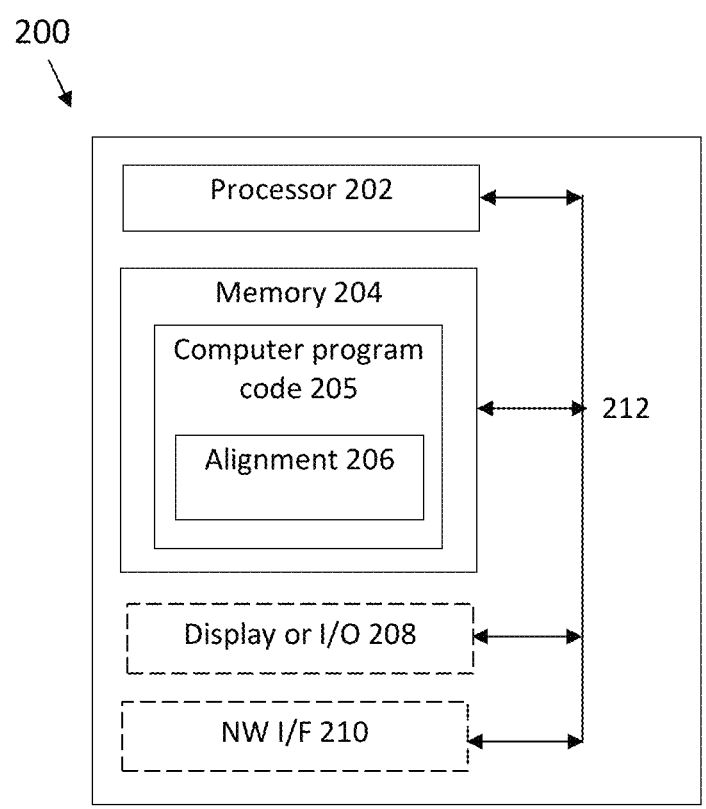
FIG. 17 is an example apparatus to implement temporal alignment of media, based on the examples described herein.

FIG. 17 is an example apparatus 200, which may be implemented in hardware, configured to implement the examples descried herein, including temporal alignment of MPEG and GLTF media. The apparatus 200 comprises at least one processor 202 (e.g. an FPGA and/or CPU), at least one memory 204 including computer program code 205, wherein the at least one memory 204 and the computer program code 205 are configured to, with the at least one processor 202, cause the apparatus 200 to implement circuitry, a process, component, module, or function (collectively 206) to implement the examples described herein, including temporal alignment of media. The memory 204 may be a non-transitory memory, a transitory memory, a volatile memory, or a non-volatile memory.

The apparatus 200 optionally includes a display and/or I/O interface 208 that may be used to display an output (e.g., an image) of a result of the component 206. The display and/or I/O interface 208 may also be configured to receive input, such as user input with using a keypad. The apparatus 200 also optionally includes one or more network (NW) interfaces (I/F(s)) 210. The NW I/F(s) 210 may be wired and/or wireless and communicate over the Internet/other network(s) via any communication technique. The NW I/F(s) 210 may comprise one or more transmitters and one or more receivers. The N/W I/F(s) 210 may comprise standard well-known components such as an amplifier, filter, frequency-converter, (de)modulator, and encoder/decoder circuitries and one or more antennas. The apparatus 200 may be a remote, virtual or cloud apparatus.

Interface 212 enables data communication between the various items of apparatus 200, as shown in FIG. 17. For example, the interface 312 may be one or more buses such as address, data, or control buses, and may include any interconnection mechanism, such as a series of lines on a motherboard or integrated circuit, fiber optics or other optical communication equipment, and the like. Computer program code 205, including alignment 206 may comprise object-oriented software configured to pass data/messages between objects within computer program code 205. The apparatus 200 need not comprise each of the features mentioned, or may comprise other features as well.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' refers to all of the following: (a) hardware circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 18:
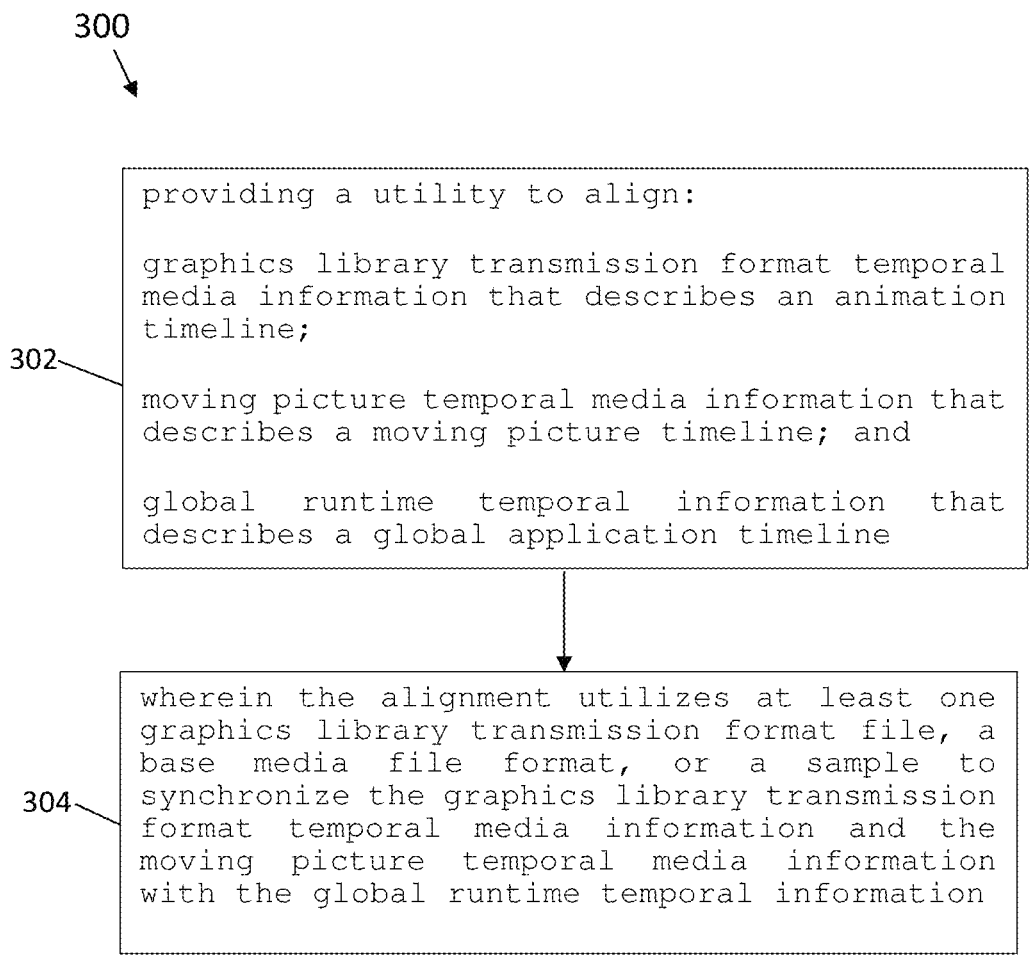
FIG. 18 is an example method to implement temporal alignment of media, based on the examples described herein.

FIG. 18 is an example method 300 to implement temporal alignment of media, based on the examples described herein. At 302, the method includes providing a utility to align: graphics library transmission format temporal media information that describes an animation timeline; moving picture temporal media information that describes a moving picture timeline; and global runtime temporal information that describes a global application timeline. At 304, the method includes wherein the alignment utilizes at least one graphics library transmission format file, a base media file format, or a sample to synchronize the graphics library transmission format temporal media information and the moving picture temporal media information with the global runtime temporal information.

Figure 19:
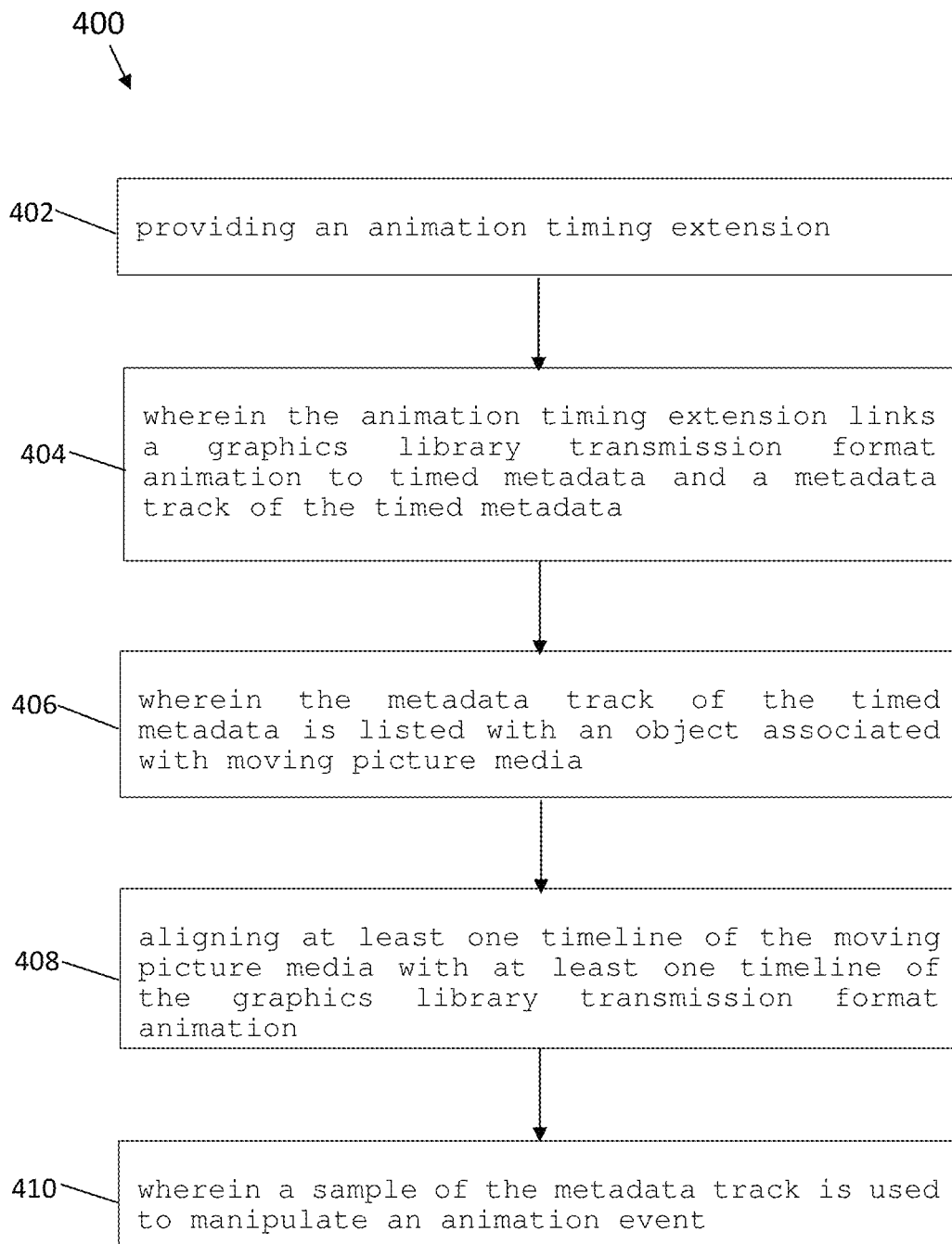
FIG. 19 is an example method, based on the embodiments described herein.

FIG. 19 is an example method 400, based on the embodiments described herein. At 402, the method includes providing an animation timing extension. At 404, the method includes wherein the animation timing extension links a graphics library transmission format animation to timed metadata and a metadata track of the timed metadata. At 406, the method includes wherein the metadata track of the timed metadata is listed with an object associated with moving picture media. At 408, the method includes aligning at least one timeline of the moving picture media with at least one timeline of the graphics library transmission format animation. At 410, the method includes wherein a sample of the metadata track is used to manipulate an animation event.

An example apparatus includes at least one processor; and at least one non-transitory memory including computer program code; wherein the at least one memory and the computer program code are configured to, with the at least one processor, cause the apparatus at least to perform: provide a utility to align: graphics library transmission format temporal media information that describes an animation timeline; moving picture temporal media information that describes a moving picture timeline; and global runtime temporal information that describes a global application timeline; wherein the alignment utilizes at least one graphics library transmission format file, a base media file format, or a sample to synchronize the graphics library transmission format temporal media information and the moving picture temporal media information with the global runtime temporal information.

The apparatus may further include wherein the graphics library transmission format temporal media information comprises at least one animation, and the moving picture temporal media information comprises at least one of video or audio.

The apparatus may further include wherein the at least one memory and the computer program code are further configured to, with the at least one processor, cause the apparatus at least to perform: provide an animation timing track within a metadata track of the base media file format together with other audio/video media, the animation timing track defining when in the global application timeline an animation should be manipulated; wherein the animation timing track manipulates at least one animation event defined in the graphics library transmission format file.

The apparatus may further include wherein binary 3D data is stored either outside of the base media file format or as an item within the base media file format.

The apparatus may further include wherein the at least one memory and the computer program code are further configured to, with the at least one processor, cause the apparatus at least to perform: provide a sample entry that identifies an animation track, the animation track containing one or more samples described by a sample format; wherein the sample format allows identifying animations from the graphics library transmission format file and to describe how the animations should be manipulated.

The apparatus may further include wherein the at least one memory and the computer program code are further configured to, with the at least one processor, cause the apparatus at least to perform: manipulate a plurality of animations within a graphics library transmission format animation array simultaneously; wherein the graphics library transmission format animation array is associated with the at least one base media file format item or at least one base media file format track containing at least one sample.

The apparatus may further include wherein the at least one memory and the computer program code are further configured to, with the at least one processor, cause the apparatus at least to perform: provide a moving picture animation extension to link from the graphics library transmission format file to a timed metadata track; wherein the moving picture animation extension is included in an extension of a scene description that uses animation timing.

The apparatus may further include wherein the at least one memory and the computer program code are further configured to, with the at least one processor, cause the apparatus at least to perform: provide a moving picture buffer extension to link from the graphics library transmission format file to an item and respective track listed by a media object; wherein the graphics library transmission format file references the base media file format and track or an item within the base media file format.

The apparatus may further include wherein the at least one memory and the computer program code are further configured to, with the at least one processor, cause the apparatus at least to perform: provide a graphics library transmission format buffer item that represents graphics library transmission format binary data.

The apparatus may further include wherein the at least one memory and the computer program code are further configured to, with the at least one processor, cause the apparatus at least to perform: store the graphics library transmission format file within a metadata track of the base media file format.

The apparatus may further include wherein a JSON patch update protocol is used to signal changes in the at least one graphics library transmission format file.

The apparatus may further include wherein the sample is configured to update a scene synchronized with other media.

The apparatus may further include wherein the sample is defined as a particular sample for a file parser to distinguish between the sample and at least one other sample carrying a patch update.

The apparatus may further include wherein the at least one memory and the computer program code are further configured to, with the at least one processor, cause the apparatus at least to perform: provide a sample entry that identifies a graphics library transmission format file track comprising the sample.

The apparatus may further include wherein the at least one memory and the computer program code are further configured to, with the at least one processor, cause the apparatus at least to perform: provide the at least one graphics library transmission format item to update a scene synchronized with moving picture media; and provide one or more patch updates as samples of a patch update graphics library transmission format track.

The apparatus may further include wherein the sample comprises a graphics library transmission format sample.

The apparatus may further include wherein the at least one memory and the computer program code are further configured to, with the at least one processor, cause the apparatus at least to: provide an animation timing extension; wherein the animation timing extension links a graphics library transmission format animation to timed metadata and a metadata track of the timed metadata; wherein the metadata track of the timed metadata is listed with an object associated with moving picture media; and align at least one timeline of the moving picture media with at least one timeline of the graphics library transmission format animation; wherein a sample of the metadata track is used to manipulate an animation event.

The apparatus may further include wherein the aligning of the at least one timeline of the moving picture media with the at least one timeline of the graphics library transmission format animation enables the creation of a narrated story.

The apparatus may further include wherein the timed metadata provides manipulation of the graphics library transmission format animation and the moving picture media.

The apparatus may further include wherein the at least one memory and the computer program code are further configured to, with the at least one processor, cause the apparatus at least to: manipulate a global timeline for narrated content, which manipulates the graphics library transmission format animation and the moving picture media.

The apparatus may further include wherein the animation timing extension references an accessor, the accessor describing a buffer where animation timing data is available, and wherein sample data from an animation timing track is provided to the buffer, and a change in the buffer triggers a change of state of the graphics library transmission format animation.

The apparatus may further include wherein the at least one memory and the computer program code are further configured to, with the at least one processor, cause the apparatus at least to: load, with a media player, the sample data into a presentation engine when a sample of the animation timing track becomes active; wherein loading the sample data into the presentation engine triggers a change of state of the graphics library transmission format animation performed with the presentation engine.

The apparatus may further include wherein the animation event is defined in a graphics library transmission format javascript object notation file.

The apparatus may further include wherein sample timing of the metadata track defines when in a global timeline an animation is to be manipulated.

The apparatus may further include wherein the metadata track is stored in the base media file format together with the moving picture media, and wherein storing the metadata track in the base media file format together with the moving picture media provides a utility to align manipulations of the graphics library transmission format animation with moving picture video and audio tracks.

The apparatus may further include wherein a default duration of the graphics library transmission format animation is defined with animation data in a binary graphics library transmission format buffer, and not with a sample duration of the base media file format.

The apparatus may further include wherein the at least one memory and the computer program code are further configured to, with the at least one processor, cause the apparatus at least to: provide an animation sample entry that identifies an animation track containing graphics library transmission format animation samples.

The apparatus may further include wherein the at least one memory and the computer program code are further configured to, with the at least one processor, cause the apparatus at least to: provide a sample format that defines a graphics library transmission format animation sample, wherein the sample format comprises at least one controlling parameter for animations defined in a graphics library transmission format animation array.

The apparatus may further include wherein the at least one controlling parameter comprises at least one of: an apply to all parameter, where when the apply to all parameter has a value of 1, a number of events parameter has a value of 1 and the animation event of the sample is applied to animations in a graphics library transmission format animations array; a number of events parameter, where the number of events parameter specifies a number of animation events triggered at a time of the sample; an index specifying an index value of animation in an animation node described in a graphics library transmission format javascript object notation file; a speed specifying a multiplier which indicates a speed of a playout of the graphics library transmission format animation; a state that indicates a status of the graphics library transmission format animation; a start frame specifying a key frame of the graphics library transmission format animation used after a loop; an end frame specifying a last key frame of the graphics library transmission format animation before looping the graphics library transmission format animation; an order identifier specifying a value to indicate an order animations are applied, where an animation with a lower value is applied before an animation with a higher value; a number of channels specifying a number of channels of an animation for which a weight parameter is provided; a weight parameter, wherein the weight parameter specifies a weight to be applied to a channel of the graphics library transmission format animation; or a channel index specifying an index of a channel of the graphics library transmission format animation.

The apparatus may further include wherein the at least one memory and the computer program code are further configured to, with the at least one processor, cause the apparatus at least to: provide at least one state value in an animation sample format.

The apparatus may further include wherein the at least one state value indicates at least one of: playing the graphics library transmission format animation; stopping the graphics library transmission format animation and returning to an initial state; stopping the graphics library transmission format animation and maintaining a final state; pausing the graphics library transmission format animation; restarting the graphics library transmission format animation, where restarting the graphics library transmission format animation is stopping the graphics library transmission format animation and playing the graphics library transmission format animation from a beginning of the graphics library transmission format animation; updating a characteristic of the graphics library transmission format animation; setting the graphics library transmission format animation to be applied repeatedly in a loop; or setting the graphics library transmission format animation to be applied repeatedly in a loop with an initial object position of a current loop being a final object position of a previous loop.

The apparatus may further include wherein one example of the base media file format is an ISO base media file format (ISOBMFF).

An example method includes providing a utility to align: graphics library transmission format temporal media information that describes an animation timeline; moving picture temporal media information that describes a moving picture timeline; and global runtime temporal information that describes a global application timeline; wherein the alignment utilizes at least one graphics library transmission format file, a base media file format, or a sample to synchronize the graphics library transmission format temporal media information and the moving picture temporal media information with the global runtime temporal information.

The method may further include wherein the graphics library transmission format temporal media information comprises at least one animation, and the moving picture temporal media information comprises at least one of video or audio.

The method may further include providing an animation timing track within a metadata track of the base media file format together with other audio/video media, the animation timing track defining when in the global application timeline an animation should be manipulated; wherein the animation timing track manipulates at least one animation event defined in the graphics library transmission format file.

The method may further include wherein binary 3D data is stored either outside of the base media file format or as an item within the base media file format.

The method may further include providing a sample entry that identifies an animation track, the animation track containing one or more samples described by a sample format; wherein the sample format allows identifying animations from the graphics library transmission format file and to describe how the animations should be manipulated.

The method may further include manipulating a plurality of animations within a graphics library transmission format animation array simultaneously; wherein the graphics library transmission format animation array is associated with the at least one base media file format item or at least one base media file format track containing at least one sample.

The method may further include providing a moving picture animation extension to link from the graphics library transmission format file to a timed metadata track; wherein the moving picture animation extension is included in an extension of a scene description that uses animation timing.

The method may further include providing a moving picture buffer extension to link from the graphics library transmission format file to an item and respective track listed by a media object; wherein the graphics library transmission format file references the base media file format and track or an item within the base media file format.

The method may further include providing a graphics library transmission format buffer item that represents graphics library transmission format binary data.

The method may further include storing the graphics library transmission format file within a metadata track of the base media file format.

The method may further include wherein a JSON patch update protocol is used to signal changes in the at least one graphics library transmission format file.

The method may further include wherein the sample is configured to update a scene synchronized with other media.

The method may further include wherein the sample is defined as a particular sample for a file parser to distinguish between the sample and at least one other sample carrying a patch update.

The method may further include providing a sample entry that identifies a graphics library transmission format file track comprising the sample.

The method may further include providing the at least one graphics library transmission format item to update a scene synchronized with moving picture media; and providing one or more patch updates as samples of a patch update graphics library transmission format track.

The method may further include wherein the sample comprises a graphics library transmission format sample.

The method may further include wherein one example of the base media file format is an ISO base media file format (ISOBMFF).

An example non-transitory program storage device readable by a machine, tangibly embodying a program of instructions executable by the machine for performing operations is provided, the operations comprising: providing a utility to align: graphics library transmission format temporal media information that describes an animation timeline; moving picture temporal media information that describes a moving picture timeline; and global runtime temporal information that describes a global application timeline; wherein the alignment utilizes at least one graphics library transmission format file, a base media file format, or a sample to synchronize the graphics library transmission format temporal media information and the moving picture temporal media information with the global runtime temporal information.

The non-transitory program storage device may further include wherein the graphics library transmission format temporal media information comprises at least one animation, and the moving picture temporal media information comprises at least one of video or audio.

The operations of the non-transitory program storage device may further include providing an animation timing track within a metadata track of the base media file format together with other audio/video media, the animation timing track defining when in the global application timeline an animation should be manipulated; wherein the animation timing track manipulates at least one animation event defined in the graphics library transmission format file.

The non-transitory program storage device may further include wherein binary 3D data is stored either outside of the base media file format or as an item within the base media file format.

The operations of the non-transitory program storage device may further include providing a sample entry that identifies an animation track, the animation track containing one or more samples described by a sample format; wherein the sample format allows identifying animations from the graphics library transmission format file and to describe how the animations should be manipulated.

The operations of the non-transitory program storage device may further include manipulating a plurality of animations within a graphics library transmission format animation array simultaneously; wherein the graphics library transmission format animation array is associated with the at least one base media file format item or at least one base media file format track containing at least one sample.

The operations of the non-transitory program storage device may further include providing a moving picture animation extension to link from the graphics library transmission format file to a timed metadata track; wherein the moving picture animation extension is included in an extension of a scene description that uses animation timing.

The operations of the non-transitory program storage device may further include providing a moving picture buffer extension to link from the graphics library transmission format file to an item and respective track listed by a media object; wherein the graphics library transmission format file references the base media file format and track or an item within the base media file format.

The operations of the non-transitory program storage device may further include providing a graphics library transmission format buffer item that represents graphics library transmission format binary data.

The operations of the non-transitory program storage device may further include storing the graphics library transmission format file within a metadata track of the base media file format.

The non-transitory program storage device may further include wherein a JSON patch update protocol is used to signal changes in the at least one graphics library transmission format file.

The non-transitory program storage device may further include wherein the sample is configured to update a scene synchronized with other media.

The non-transitory program storage device may further include wherein the sample is defined as a particular sample for a file parser to distinguish between the sample and at least one other sample carrying a patch update.

The operations of the non-transitory program storage device may further include providing a sample entry that identifies a graphics library transmission format file track comprising the sample.

The operations of the non-transitory program storage device may further include providing the at least one graphics library transmission format item to update a scene synchronized with moving picture media; and providing one or more patch updates as samples of a patch update graphics library transmission format track.

The non-transitory program storage device may further include wherein the sample comprises a graphics library transmission format sample.

The non-transitory program storage device may further include wherein one example of the base media file format is an ISO base media file format (ISOBMFF).

An example apparatus includes means for providing a utility to align: graphics library transmission format temporal media information that describes an animation timeline; moving picture temporal media information that describes a moving picture timeline; and global runtime temporal information that describes a global application timeline; wherein the alignment utilizes at least one graphics library transmission format file, a base media file format, or a sample to synchronize the graphics library transmission format temporal media information and the moving picture temporal media information with the global runtime temporal information.

The apparatus may further include wherein the graphics library transmission format temporal media information comprises at least one animation, and the moving picture temporal media information comprises at least one of video or audio.

The apparatus may further include means for providing an animation timing track within a metadata track of the base media file format together with other audio/video media, the animation timing track defining when in the global application timeline an animation should be manipulated; wherein the animation timing track manipulates at least one animation event defined in the graphics library transmission format file.

The apparatus may further include wherein binary 3D data is stored either outside of the base media file format or as an item within the base media file format.

The apparatus may further include means for providing a sample entry that identifies an animation track, the animation track containing one or more samples described by a sample format; wherein the sample format allows identifying animations from the graphics library transmission format file and to describe how the animations should be manipulated.

The apparatus may further include means for manipulating a plurality of animations within a graphics library transmission format animation array simultaneously; wherein the graphics library transmission format animation array is associated with the at least one base media file format item or at least one base media file format track containing at least one sample.

The apparatus may further include means for providing a moving picture animation extension to link from the graphics library transmission format file to a timed metadata track; wherein the moving picture animation extension is included in an extension of a scene description that uses animation timing.

The apparatus may further include means for providing a moving picture buffer extension to link from the graphics library transmission format file to an item and respective track listed by a media object; wherein the graphics library transmission format file references the base media file format and track or an item within the base media file format.

The apparatus may further include means for providing a graphics library transmission format buffer item that represents graphics library transmission format binary data.

The apparatus may further include means for storing the graphics library transmission format file within a metadata track of the base media file format.

The apparatus may further include wherein a JSON patch update protocol is used to signal changes in the at least one graphics library transmission format file.

The apparatus may further include wherein the sample is configured to update a scene synchronized with other media.

The apparatus may further include wherein the sample is defined as a particular sample for a file parser to distinguish between the sample and at least one other sample carrying a patch update.

The apparatus may further include means for providing a sample entry that identifies a graphics library transmission format file track comprising the sample.

The apparatus may further include means for providing the at least one graphics library transmission format item to update a scene synchronized with moving picture media;

and means for providing one or more patch updates as samples of a patch update graphics library transmission format track.

The apparatus may further include wherein the sample comprises a graphics library transmission format sample.

The apparatus may further include means for providing an animation timing extension; wherein the animation timing extension links a graphics library transmission format animation to timed metadata and a metadata track of the timed metadata; wherein the metadata track of the timed metadata is listed with an object associated with moving picture media; and means for aligning at least one timeline of the moving picture media with at least one timeline of the graphics library transmission format animation; wherein a sample of the metadata track is used to manipulate an animation event.

The apparatus may further include wherein the aligning of the at least one timeline of the moving picture media with the at least one timeline of the graphics library transmission format animation enables the creation of a narrated story.

The apparatus may further include wherein the timed metadata provides manipulation of the graphics library transmission format animation and the moving picture media.

The apparatus may further include means for manipulating a global timeline for narrated content, which manipulates the graphics library transmission format animation and the moving picture media.

The apparatus may further include wherein the animation timing extension references an accessor, the accessor describing a buffer where animation timing data is available, and wherein sample data from an animation timing track is provided to the buffer, and a change in the buffer triggers a change of state of the graphics library transmission format animation.

The apparatus may further include means for loading, with a media player, the sample data into a presentation engine when a sample of the animation timing track becomes active; wherein loading the sample data into the presentation engine triggers a change of state of the graphics library transmission format animation performed with the presentation engine.

The apparatus may further include wherein the animation event is defined in a graphics library transmission format javascript object notation file.

The apparatus may further include wherein sample timing of the metadata track defines when in a global timeline an animation is to be manipulated.

The apparatus may further include wherein the metadata track is stored in a base media file format together with the moving picture media, and wherein storing the metadata track in the base media file format together with the moving picture media provides a utility to align manipulations of the graphics library transmission format animation with moving picture video and audio tracks.

The apparatus may further include wherein a default duration of the graphics library transmission format animation is defined with animation data in a binary graphics library transmission format buffer, and not with a sample duration of a base media file format.

The apparatus may further include means for providing an animation sample entry that identifies an animation track containing graphics library transmission format animation samples.

The apparatus may further include means for providing a sample format that defines a graphics library transmission format animation sample, wherein the sample format comprises at least one controlling parameter for animations defined in a graphics library transmission format animation array.

The apparatus may further include wherein the at least one controlling parameter comprises at least one of: an apply to all parameter, where when the apply to all parameter has a value of 1, a number of events parameter has a value of 1 and the animation event of the sample is applied to animations in a graphics library transmission format animations array; a number of events parameter, where the number of events parameter specifies a number of animation events triggered at a time of the sample; an index specifying an index value of animation in an animation node described in a graphics library transmission format javascript object notation file; a speed specifying a multiplier which indicates a speed of a playout of the graphics library transmission format animation; a state that indicates a status of the graphics library transmission format animation; a start frame specifying a key frame of the graphics library transmission format animation used after a loop; an end frame specifying a last key frame of the graphics library transmission format animation before looping the graphics library transmission format animation; an order identifier specifying a value to indicate an order animations are applied, where an animation with a lower value is applied before an animation with a higher value; a number of channels specifying a number of channels of an animation for which a weight parameter is provided; a weight parameter, wherein the weight parameter specifies a weight to be applied to a channel of the graphics library transmission format animation; or a channel index specifying an index of a channel of the graphics library transmission format animation.

The apparatus may further include means for providing at least one state value in an animation sample format.

The apparatus may further include wherein the at least one state value indicates at least one of: playing the graphics library transmission format animation; stopping the graphics library transmission format animation and returning to an initial state; stopping the graphics library transmission format animation and maintaining a final state; pausing the graphics library transmission format animation; restarting the graphics library transmission format animation, where restarting the graphics library transmission format animation is stopping the graphics library transmission format animation and playing the graphics library transmission format animation from a beginning of the graphics library transmission format animation; updating a characteristic of the graphics library transmission format animation; setting the graphics library transmission format animation to be applied repeatedly in a loop; or setting the graphics library transmission format animation to be applied repeatedly in a loop with an initial object position of a current loop being a final object position of a previous loop.

The apparatus may further include wherein one example of the base media file format is an ISO base media file format (ISOBMFF).

An apparatus includes one or more circuitries configured to implement a method comprising any of the methods described herein for temporal alignment, including a method comprising: providing a utility to align: graphics library transmission format temporal media information that describes an animation timeline; moving picture temporal media information that describes a moving picture timeline; and global runtime temporal information that describes a global application timeline; wherein the alignment utilizes at least one graphics library transmission format file, a base media file format, or a sample to synchronize the graphics library transmission format temporal media information and the moving picture temporal media information with the global runtime temporal information.

An example apparatus includes means for providing an animation timing extension; wherein the animation timing extension links a graphics library transmission format animation to timed metadata and a metadata track of the timed metadata; wherein the metadata track of the timed metadata is listed with an object associated with moving picture media; and means for aligning at least one timeline of the moving picture media with at least one timeline of the graphics library transmission format animation; wherein a sample of the metadata track is used to manipulate an animation event.

The apparatus may further include wherein the aligning of the at least one timeline of the moving picture media with the at least one timeline of the graphics library transmission format animation enables the creation of a narrated story.

The apparatus may further include wherein the timed metadata provides manipulation of the graphics library transmission format animation and the moving picture media.

The apparatus may further include means for manipulating a global timeline for narrated content, which manipulates the graphics library transmission format animation and the moving picture media.

The apparatus may further include wherein the animation timing extension references an accessor, the accessor describing a buffer where animation timing data is available, and wherein sample data from an animation timing track is provided to the buffer, and a change in the buffer triggers a change of state of the graphics library transmission format animation.

The apparatus may further include means for loading, with a media player, the sample data into a presentation engine when a sample of the animation timing track becomes active; wherein loading the sample data into the presentation engine triggers a change of state of the graphics library transmission format animation performed with the presentation engine.

The apparatus may further include wherein the animation event is defined in a graphics library transmission format javascript object notation file.

The apparatus may further include wherein sample timing of the metadata track defines when in a global timeline an animation is to be manipulated.

The apparatus may further include wherein the metadata track is stored in a base media file format together with the moving picture media, and wherein storing the metadata track in the base media file format together with the moving picture media provides a utility to align manipulations of the graphics library transmission format animation with moving picture video and audio tracks.

The apparatus may further include wherein a default duration of the graphics library transmission format animation is defined with animation data in a binary graphics library transmission format buffer, and not with a sample duration of a base media file format.

The apparatus may further include means for providing an animation sample entry that identifies an animation track containing graphics library transmission format animation samples.

The apparatus may further include means for providing a sample format that defines a graphics library transmission format animation sample, wherein the sample format comprises at least one controlling parameter for animations defined in a graphics library transmission format animation array.

The apparatus may further include wherein the at least one controlling parameter comprises at least one of: an apply to all parameter, where when the apply to all parameter has a value of 1, a number of events parameter has a value of 1 and the animation event of the sample is applied to animations in a graphics library transmission format animations array; a number of events parameter, where the number of events parameter specifies a number of animation events triggered at a time of the sample; an index specifying an index value of animation in an animation node described in a graphics library transmission format javascript object notation file; a speed specifying a multiplier which indicates a speed of a playout of the graphics library transmission format animation; a state that indicates a status of the graphics library transmission format animation; a start frame specifying a key frame of the graphics library transmission format animation used after a loop; an end frame specifying a last key frame of the graphics library transmission format animation before looping the graphics library transmission format animation; an order identifier specifying a value to indicate an order animations are applied, where an animation with a lower value is applied before an animation with a higher value; a number of channels specifying a number of channels of an animation for which a weight parameter is provided; a weight parameter, wherein the weight parameter specifies a weight to be applied to a channel of the graphics library transmission format animation; or a channel index specifying an index of a channel of the graphics library transmission format animation.

The apparatus may further include means for providing at least one state value in an animation sample format.

The apparatus may further include wherein the at least one state value indicates at least one of: playing the graphics library transmission format animation; stopping the graphics library transmission format animation and returning to an initial state; stopping the graphics library transmission format animation and maintaining a final state; pausing the graphics library transmission format animation; restarting the graphics library transmission format animation, where restarting the graphics library transmission format animation is stopping the graphics library transmission format animation and playing the graphics library transmission format animation from a beginning of the graphics library transmission format animation; updating a characteristic of the graphics library transmission format animation; setting the graphics library transmission format animation to be applied repeatedly in a loop; or setting the graphics library transmission format animation to be applied repeatedly in a loop with an initial object position of a current loop being a final object position of a previous loop.

The apparatus may further include means for providing a utility to align: graphics library transmission format temporal media information that describes an animation timeline; moving picture temporal media information that describes a moving picture timeline; and global runtime temporal information that describes a global application timeline; wherein the alignment utilizes at least one graphics library transmission format file, a base media file format, or a synchronizing sample to synchronize the graphics library transmission format temporal media information and the moving picture temporal media information with the global runtime temporal information.

The apparatus may further include wherein the graphics library transmission format temporal media information comprises at least one animation, and the moving picture temporal media information comprises at least one of video or audio.

The apparatus may further include means for providing an animation timing track within a metadata track of the base media file format together with other audio or video media, the animation timing track defining when in the global application timeline an animation should be manipulated; wherein the animation timing track manipulates at least one animation event defined in the graphics library transmission format file.

The apparatus may further include wherein binary three-dimensional data is stored either outside of the base media file format or as an item within the base media file format.

The apparatus may further include means for providing a sample entry that identifies an animation track, the animation track containing one or more samples described by a sample format; wherein the sample format allows identifying animations from the graphics library transmission format file and to describe how the animations should be manipulated.

The apparatus may further include means for manipulating a plurality of animations within a graphics library transmission format animation array simultaneously; wherein the graphics library transmission format animation array is associated with the at least one base media file format item or at least one base media file format track containing at least one sample.

The apparatus may further include wherein: the animation timing extension links from the graphics library transmission format file to the metadata track; and the animation timing extension is included in an extension of a scene description that uses animation timing.

The apparatus may further include means for providing a moving picture buffer extension to link from the graphics library transmission format file to an item and respective track listed by a media object; wherein the graphics library transmission format file references the base media file format and track or an item within the base media file format.

The apparatus may further include means for providing a graphics library transmission format buffer item that represents graphics library transmission format binary data.

The apparatus may further include means for storing the graphics library transmission format file within a metadata track of the base media file format.

The apparatus may further include wherein a javascript object notation patch update protocol is used to signal changes in the at least one graphics library transmission format file.

The apparatus may further include wherein the synchronizing sample is configured to update a scene synchronized with other media.

The apparatus may further include wherein the synchronizing sample is defined as a particular sample for a file parser to distinguish between the synchronizing sample and at least one other sample carrying a patch update.

The apparatus may further include means for providing a sample entry that identifies a graphics library transmission format file track comprising the synchronizing sample; means for providing the at least one graphics library transmission format item to update a scene synchronized with the moving picture media; and means for providing one or more patch updates as samples of a patch update graphics library transmission format track.

The apparatus may further include wherein the synchronizing sample comprises a graphics library transmission format sample.

The apparatus may further include wherein the animation timing extension comprises a moving picture animation timing extension.

The apparatus may further include wherein one example of the base media file format is an ISO base media file format (ISOBMFF).

An example apparatus includes at least one processor; and at least one memory including computer program code; wherein the at least one memory and the computer program code are configured to, with the at least one processor, cause the apparatus at least to: provide an animation timing extension; wherein the animation timing extension links a graphics library transmission format animation to timed metadata and a metadata track of the timed metadata; wherein the metadata track of the timed metadata is listed with an object associated with moving picture media; and align at least one timeline of the moving picture media with at least one timeline of the graphics library transmission format animation; wherein a sample of the metadata track is used to manipulate an animation event.

The apparatus may further include wherein the aligning of the at least one timeline of the moving picture media with the at least one timeline of the graphics library transmission format animation enables the creation of a narrated story.

The apparatus may further include wherein the timed metadata provides manipulation of the graphics library transmission format animation and the moving picture media.

The apparatus may further include wherein the at least one memory and the computer program code are further configured to, with the at least one processor, cause the apparatus at least to: manipulate a global timeline for narrated content, which manipulates the graphics library transmission format animation and the moving picture media.

The apparatus may further include wherein the animation timing extension references an accessor, the accessor describing a buffer where animation timing data is available, and wherein sample data from an animation timing track is provided to the buffer, and a change in the buffer triggers a change of state of the graphics library transmission format animation.

The apparatus may further include wherein the at least one memory and the computer program code are further configured to, with the at least one processor, cause the apparatus at least to: load, with a media player, the sample data into a presentation engine when a sample of the animation timing track becomes active; wherein loading the sample data into the presentation engine triggers a change of state of the graphics library transmission format animation performed with the presentation engine.

The apparatus may further include wherein the animation event is defined in a graphics library transmission format javascript object notation file.

The apparatus may further include wherein sample timing of the metadata track defines when in a global timeline an animation is to be manipulated.

The apparatus may further include wherein the metadata track is stored in a base media file format together with the moving picture media, and wherein storing the metadata track in the base media file format together with the moving picture media provides a utility to align manipulations of the graphics library transmission format animation with moving picture video and audio tracks.

The apparatus may further include wherein a default duration of the graphics library transmission format animation is defined with animation data in a binary graphics library transmission format buffer, and not with a sample duration of a base media file format.

The apparatus may further include wherein the at least one memory and the computer program code are further configured to, with the at least one processor, cause the apparatus at least to: provide an animation sample entry that identifies an animation track containing graphics library transmission format animation samples.

The apparatus may further include wherein the at least one memory and the computer program code are further configured to, with the at least one processor, cause the apparatus at least to: provide a sample format that defines a graphics library transmission format animation sample, wherein the sample format comprises at least one controlling parameter for animations defined in a graphics library transmission format animation array.

The apparatus may further include wherein the at least one controlling parameter comprises at least one of: an apply to all parameter, where when the apply to all parameter has a value of 1, a number of events parameter has a value of 1 and the animation event of the sample is applied to animations in a graphics library transmission format animations array; a number of events parameter, where the number of events parameter specifies a number of animation events triggered at a time of the sample; an index specifying an index value of animation in an animation node described in a graphics library transmission format javascript object notation file; a speed specifying a multiplier which indicates a speed of a playout of the graphics library transmission format animation; a state that indicates a status of the graphics library transmission format animation; a start frame specifying a key frame of the graphics library transmission format animation used after a loop; an end frame specifying a last key frame of the graphics library transmission format animation before looping the graphics library transmission format animation; an order identifier specifying a value to indicate an order animations are applied, where an animation with a lower value is applied before an animation with a higher value; a number of channels specifying a number of channels of an animation for which a weight parameter is provided; a weight parameter, wherein the weight parameter specifies a weight to be applied to a channel of the graphics library transmission format animation; or a channel index specifying an index of a channel of the graphics library transmission format animation.

The apparatus may further include wherein the at least one memory and the computer program code are further configured to, with the at least one processor, cause the apparatus at least to: provide at least one state value in an animation sample format.

The apparatus may further include wherein the at least one state value indicates at least one of: playing the graphics library transmission format animation; stopping the graphics library transmission format animation and returning to an initial state; stopping the graphics library transmission format animation and maintaining a final state; pausing the graphics library transmission format animation; restarting the graphics library transmission format animation, where restarting the graphics library transmission format animation is stopping the graphics library transmission format animation and playing the graphics library transmission format animation from a beginning of the graphics library transmission format animation; updating a characteristic of the graphics library transmission format animation; setting the graphics library transmission format animation to be applied repeatedly in a loop; or setting the graphics library transmission format animation to be applied repeatedly in a loop with an initial object position of a current loop being a final object position of a previous loop.

The apparatus may further include wherein the at least one memory and the computer program code are further configured to, with the at least one processor, cause the apparatus at least to: provide a utility to align: graphics library transmission format temporal media information that describes an animation timeline; moving picture temporal media information that describes a moving picture timeline; and global runtime temporal information that describes a global application timeline; wherein the alignment utilizes at least one graphics library transmission format file, a base media file format, or a synchronizing sample to synchronize the graphics library transmission format temporal media information and the moving picture temporal media information with the global runtime temporal information.

The apparatus may further include wherein the graphics library transmission format temporal media information comprises at least one animation, and the moving picture temporal media information comprises at least one of video or audio.

The apparatus may further include wherein the at least one memory and the computer program code are further configured to, with the at least one processor, cause the apparatus at least to: provide an animation timing track within a metadata track of the base media file format together with other audio or video media, the animation timing track defining when in the global application timeline an animation should be manipulated; wherein the animation timing track manipulates at least one animation event defined in the graphics library transmission format file.

The apparatus may further include wherein binary three-dimensional data is stored either outside of the base media file format or as an item within the base media file format.

The apparatus may further include wherein the at least one memory and the computer program code are further configured to, with the at least one processor, cause the apparatus at least to: provide a sample entry that identifies an animation track, the animation track containing one or more samples described by a sample format; wherein the sample format allows identifying animations from the graphics library transmission format file and to describe how the animations should be manipulated.

The apparatus may further include wherein the at least one memory and the computer program code are further configured to, with the at least one processor, cause the apparatus at least to: manipulate a plurality of animations within a graphics library transmission format animation array simultaneously; wherein the graphics library transmission format animation array is associated with the at least one base media file format item or at least one base media file format track containing at least one sample.

The apparatus may further include wherein: the animation timing extension links from the graphics library transmission format file to the metadata track; and the animation timing extension is included in an extension of a scene description that uses animation timing.

The apparatus may further include wherein the at least one memory and the computer program code are further configured to, with the at least one processor, cause the apparatus at least to: provide a moving picture buffer extension to link from the graphics library transmission format file to an item and respective track listed by a media object;

wherein the graphics library transmission format file references the base media file format and track or an item within the base media file format.

The apparatus may further include wherein the at least one memory and the computer program code are further configured to, with the at least one processor, cause the apparatus at least to: provide a graphics library transmission format buffer item that represents graphics library transmission format binary data.

The apparatus may further include wherein the at least one memory and the computer program code are further configured to, with the at least one processor, cause the apparatus at least to: store the graphics library transmission format file within a metadata track of the base media file format.

The apparatus may further include wherein a javascript object notation patch update protocol is used to signal changes in the at least one graphics library transmission format file.

The apparatus may further include wherein the synchronizing sample is configured to update a scene synchronized with other media.

The apparatus may further include wherein the synchronizing sample is defined as a particular sample for a file parser to distinguish between the synchronizing sample and at least one other sample carrying a patch update.

The apparatus may further include wherein the at least one memory and the computer program code are further configured to, with the at least one processor, cause the apparatus at least to: provide a sample entry that identifies a graphics library transmission format file track comprising the synchronizing sample; provide the at least one graphics library transmission format item to update a scene synchronized with the moving picture media; and provide one or more patch updates as samples of a patch update graphics library transmission format track.

The apparatus may further include wherein the synchronizing sample comprises a graphics library transmission format sample.

The apparatus may further include wherein the animation timing extension comprises a moving picture animation timing extension.

The apparatus may further include wherein one example of the base media file format is an ISO base media file format (ISOBMFF).

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

3D or 3d three-dimensional
3GPP 3rd Generation Partnership Project
4CC four-character code
6dof six degrees of freedom
API application programming interface
AR augmented reality
CTS composition time stamp
DASH dynamic adaptive streaming over HTTP
GL graphics library
GLB binary file format representation of 3D models saved in the GL Transmission Format (glTF)
GLTF or glTF graphics library transmission format
GOP group of pictures
GPU graphics processing unit
HEIF high efficiency image file format
HEVC high efficiency video coding
HTTP hypertext transfer protocol
id or ID identifier
IEC International Electrotechnical Commission
I/F interface
I/O input/output
ISO International Organization for Standardization
ISOBMFF ISO Base Media File Format
JSON JavaScript Object Notation
MP4 MPEG-4 Part 14
MPEG moving picture experts group
MPEG-I MPEG immersive
NW network
RFC request for comments
SAP stream access point
SC subcommittee
URI uniform resource identifier
WG working group
XML eXtensible Markup Language

What is claimed is:

1. An apparatus comprising:
   at least one processor; and
   at least one non-transitory memory storing instructions that, when executed by the at least one processor, cause the apparatus at least to:
   provide an animation timing extension;
   wherein the animation timing extension links a graphics library transmission format animation to timed metadata and a metadata track of the timed metadata;
   wherein the animation timing extension references an accessor, the accessor describing a buffer where animation timing data is available, and wherein sample data from an animation timing track is provided to the buffer, and a change in the buffer triggers a change of state of the graphics library transmission format animation;
   wherein the metadata track of the timed metadata is listed with an object associated with moving picture media; and
   align at least one timeline of the moving picture media with at least one timeline of the graphics library transmission format animation;
   wherein a sample of the metadata track is used to manipulate an animation event.

2. The apparatus of claim 1, wherein the aligning of the at least one timeline of the moving picture media with the at least one timeline of the graphics library transmission format animation enables the creation of a narrated story.

3. The apparatus of claim 1, wherein the timed metadata provides manipulation of the graphics library transmission format animation and the moving picture media.

4. The apparatus of claim 1, wherein the instructions, when executed by the at least one processor, cause the apparatus at least to:
   manipulate a global timeline for narrated content, which manipulates the graphics library transmission format animation and the moving picture media.

5. The apparatus of claim 1, wherein the instructions, when executed by the at least one processor, cause the apparatus at least to:

load, with a media player, the sample data into a presentation engine when a sample of the animation timing track becomes active;

wherein loading the sample data into the presentation engine triggers a change of the state of the graphics library transmission format animation performed with the presentation engine.

6. The apparatus of claim 1, wherein the animation event is defined in a graphics library transmission format javascript object notation file.

7. The apparatus of claim 1, wherein sample timing of the metadata track defines when in a global timeline an animation is to be manipulated.

8. The apparatus of claim 1, wherein the metadata track is stored in a base media file format together with the moving picture media, and wherein storing the metadata track in the base media file format together with the moving picture media provides a utility to align manipulations of the graphics library transmission format animation with moving picture video and audio tracks.

9. The apparatus of claim 1, wherein a default duration of the graphics library transmission format animation is defined with animation data in a binary graphics library transmission format buffer, and not with a sample duration of a base media file format.

10. The apparatus of claim 1, wherein the instructions, when executed by the at least one processor, cause the apparatus at least to:

provide an animation sample entry that identifies an animation track containing graphics library transmission format animation samples.

11. The apparatus of claim 1, wherein the instructions, when executed by the at least one processor, cause the apparatus at least to:

provide a sample format that defines a graphics library transmission format animation sample, wherein the sample format comprises at least one controlling parameter for animations defined in a graphics library transmission format animations array.

12. The apparatus of claim 11, wherein the at least one controlling parameter comprises at least one of:

an apply to all parameter, where when the apply to all parameter has a value of 1, a number of events parameter has a value of 1 and the animation event of the sample is applied to animations in the graphics library transmission format animations array;

a number of events parameter, where the number of events parameter specifies a number of animation events triggered at a time of the sample;

an index specifying an index value of animation in an animation node described in a graphics library transmission format javascript object notation file;

a speed specifying a multiplier which indicates a speed of a playout of the graphics library transmission format animation;

the state that indicates a status of the graphics library transmission format animation;

a start frame specifying a key frame of the graphics library transmission format animation used after a loop;

an end frame specifying a last key frame of the graphics library transmission format animation before looping the graphics library transmission format animation;

an order identifier specifying a value to indicate an order animations are applied, where an animation with a lower value is applied before an animation with a higher value;

a number of channels specifying a number of channels of an animation for which a weight parameter is provided;

a weight parameter, wherein the weight parameter specifies a weight to be applied to a channel of the graphics library transmission format animation; or a channel index specifying an index of a channel of the graphics library transmission format animation.

13. The apparatus of claim 1, wherein the instructions, when executed by the at least one processor, cause the apparatus at least to:

provide at least one state value in an animation sample format.

14. The apparatus of claim 13, wherein the at least one state value indicates at least one of:

playing the graphics library transmission format animation;

stopping the graphics library transmission format animation and returning to an initial state;

stopping the graphics library transmission format animation and maintaining a final state;

pausing the graphics library transmission format animation;

restarting the graphics library transmission format animation, where restarting the graphics library transmission format animation is stopping the graphics library transmission format animation and playing the graphics library transmission format animation from a beginning of the graphics library transmission format animation;

updating a characteristic of the graphics library transmission format animation;

setting the graphics library transmission format animation to be applied repeatedly in a loop; or setting the graphics library transmission format animation to be applied repeatedly in a loop with an initial object position of a current loop being a final object position of a previous loop.

15. The apparatus of claim 8, wherein the base media file format comprises an International Organization for Standardization (ISO) base media file format.

16. An apparatus comprising:

at least one processor; and at least one non-transitory memory storing instructions that, when executed by the at least one processor, cause the apparatus at least to:

provide a utility to align:

graphics library transmission format temporal media information that describes an animation timeline;

moving picture temporal media information that describes a moving picture timeline; and global runtime temporal information that describes a global application timeline;

wherein the alignment utilizes at least one graphics library transmission format file, a base media file format, or a sample to synchronize the graphics library transmission format temporal media information and the moving picture temporal media information with the global runtime temporal information; and manipulate a plurality of animations within a graphics library transmission format animation array simultaneously;

wherein the graphics library transmission format animation array is associated with the at least one base media file format item or at least one base media file format track containing at least one other sample.

17. The apparatus of claim 16, wherein the graphics library transmission format temporal media information comprises at least one animation, and the moving picture temporal media information comprises at least one of video or audio.

18. The apparatus of claim 16, wherein the instructions, when executed by at least one memory and the computer program code are further configured to, with the at least one processor, cause the apparatus at least to:
provide an animation timing track within a metadata track of the base media file format together with other audio or video media, the animation timing track defining when in the global application timeline an animation should be manipulated;
wherein the animation timing track manipulates at least one animation event defined in the graphics library transmission format file.

19. The apparatus of claim 16, wherein binary three-dimensional data is stored either outside of the base media file format or as an item within the base media file format.

20. The apparatus of claim 16, wherein the instructions, when executed by the at least one processor, cause the apparatus at least to:
provide a sample entry that identifies an animation track, the animation track containing one or more samples described by a sample format;
wherein the sample format allows identifying animations from the graphics library transmission format file and to describe how the animations should be manipulated.

21. The apparatus of claim 16, wherein the instructions, when executed by the at least one processor, cause the apparatus at least to:
provide a moving picture animation extension to link from the graphics library transmission format file to a timed metadata track;
wherein the moving picture animation extension is included in an extension of a scene description that uses animation timing.

22. The apparatus of claim 16, wherein the instructions, when executed by the at least one processor, cause the apparatus at least to:
provide a moving picture buffer extension to link from the graphics library transmission format file to an item and respective track listed by a media object;
wherein the graphics library transmission format file references the base media file format and track or an item within the base media file format.

23. The apparatus of claim 16, wherein the instructions, when executed by the at least one processor, cause the apparatus at least to:
provide a graphics library transmission format buffer item that represents graphics library transmission format binary data.

24. The apparatus of claim 16, wherein the instructions, when executed by the at least one processor, cause the apparatus at least to:
store the graphics library transmission format file within a metadata track of the base media file format.

25. The apparatus of claim 16, wherein a javascript object notation patch update protocol is used to signal changes in the at least one graphics library transmission format file.

26. The apparatus of claim 16, wherein the sample is configured to update a scene synchronized with other media.

27. The apparatus of claim 16, wherein the sample is defined as a particular sample for a file parser to distinguish between the sample and at least one other sample carrying a patch update.

28. The apparatus of claim 16, wherein the instructions, when executed by the at least one processor, cause the apparatus at least to:
provide a sample entry that identifies a graphics library transmission format file track comprising the sample;
provide the at least one graphics library transmission format item to update a scene synchronized with moving picture media; and
provide one or more patch updates as samples of a patch update graphics library transmission format track.

29. The apparatus of claim 16, wherein the sample comprises a graphics library transmission format sample.

30. The apparatus of claim 16, wherein the base media file format comprises an International Organization for Standardization (ISO) base media file format.

31. An apparatus comprising:
at least one processor; and
at least one non-transitory memory storing instructions that, when executed by the at least one processor, cause the apparatus at least to:
provide an animation timing extension;
wherein the animation timing extension links a graphics library transmission format animation to timed metadata and a metadata track of the timed metadata;
wherein the metadata track of the timed metadata is listed with an object associated with moving picture media;
align at least one timeline of the moving picture media with at least one timeline of the graphics library transmission format animation;
wherein a sample of the metadata track is used to manipulate an animation event; and
provide a sample format that defines a graphics library transmission format animation sample, wherein the sample format comprises at least one controlling parameter for animations defined in a graphics library transmission format animations array.

32. An apparatus comprising:
at least one processor; and
at least one non-transitory memory storing instructions that, when executed by the at least one processor, cause the apparatus at least to:
provide an animation timing extension;
wherein the animation timing extension links a graphics library transmission format animation to timed metadata and a metadata track of the timed metadata;
wherein the metadata track of the timed metadata is listed with an object associated with moving picture media;
align at least one timeline of the moving picture media with at least one timeline of the graphics library transmission format animation;
wherein a sample of the metadata track is used to manipulate an animation event; and
provide at least one state value in an animation sample format;
wherein the at least one state value indicates at least one of:
playing the graphics library transmission format animation;
stopping the graphics library transmission format animation and returning to an initial state;
stopping the graphics library transmission format animation and maintaining a final state;
pausing the graphics library transmission format animation;
restarting the graphics library transmission format animation, where restarting the graphics library transmission format animation is stopping the graphics library transmission format animation and playing the graphics library transmission format animation from a beginning of the graphics library transmission format animation;

updating a characteristic of the graphics library transmission format animation;

setting the graphics library transmission format animation to be applied repeatedly in a loop; or setting the graphics library transmission format animation to be applied repeatedly in a loop with an initial object position of a current loop being a final object position of a previous loop.

33. An apparatus comprising:

at least one processor; and at least one non-transitory memory storing instructions that, when executed by the at least one processor, cause the apparatus at least to:

provide a utility to align:
  graphics library transmission format temporal media information that describes an animation timeline;
  moving picture temporal media information that describes a moving picture timeline; and
  global runtime temporal information that describes a global application timeline;

wherein the alignment utilizes at least one graphics library transmission format file, a base media file format, or a sample to synchronize the graphics library transmission format temporal media information and the moving picture temporal media information with the global runtime temporal information; and provide a moving picture buffer extension to link from the graphics library transmission format file to an item and respective track listed by a media object;

wherein the graphics library transmission format file references the base media file format and track or an item within the base media file format.

34. An apparatus comprising:

at least one processor; and at least one non-transitory memory storing instructions that, when executed by the at least one processor, cause the apparatus at least to:

provide a utility to align:
  graphics library transmission format temporal media information that describes an animation timeline;
  moving picture temporal media information that describes a moving picture timeline; and
  global runtime temporal information that describes a global application timeline;

wherein the alignment utilizes at least one graphics library transmission format file, a base media file format, or a sample to synchronize the graphics library transmission format temporal media information and the moving picture temporal media information with the global runtime temporal information;

provide a sample entry that identifies a graphics library transmission format file track comprising the sample;

provide the at least one graphics library transmission format item to update a scene synchronized with moving picture media; and provide one or more patch updates as samples of a patch update graphics library transmission format track.

* * * * *